(12) United States Patent
Purcell et al.

(10) Patent No.: US 7,426,603 B2
(45) Date of Patent: Sep. 16, 2008

(54) MEMORY BUS ARBITRATION USING MEMORY BANK READINESS

(75) Inventors: Stephen Clark Purcell, Mountain View, CA (US); Scott Kimura, San Jose, CA (US)

(73) Assignee: Pasternak Solutions, LLC, Los Altos, CA (US)

( * ) Notice: Subject to any disclaimer, the term of this patent is extended or adjusted under 35 U.S.C. 154(b) by 14 days.

(21) Appl. No.: 11/499,015

(22) Filed: Aug. 4, 2006

(65) Prior Publication Data

US 2006/0271724 A1    Nov. 30, 2006

Related U.S. Application Data

(60) Division of application No. 10/759,376, filed on Jan. 15, 2004, now Pat. No. 7,107,386, which is a continuation of application No. 09/925,158, filed on Aug. 8, 2001, now abandoned.

(51) Int. Cl.
*G06F 12/00* (2006.01)

(52) U.S. Cl. .......................... 711/5; 711/151; 711/158; 710/39; 710/240; 710/244

(58) Field of Classification Search ................ 711/5, 711/151, 158; 710/39, 240, 244
See application file for complete search history.

(56) References Cited

U.S. PATENT DOCUMENTS

| | | | |
|---|---|---|---|
| 6,381,686 B1 * | 4/2002 | Imamura | 711/203 |
| 6,591,349 B1 * | 7/2003 | Steinman et al. | 711/154 |
| 6,598,132 B2 * | 7/2003 | Tran et al. | 711/154 |
| 6,622,225 B1 * | 9/2003 | Kessler et al. | 711/158 |
| 7,076,617 B2 * | 7/2006 | Dodd | 711/156 |

* cited by examiner

*Primary Examiner*—Jasmine Song
(74) *Attorney, Agent, or Firm*—McDonnell Boehnen Hulbert & Berghoff LLP

(57) ABSTRACT

A method, apparatus, and computer program product includes identifying a plurality of memory transactions to be sent over a memory bus to a memory having a plurality of memory banks, each memory transaction addressed to one of the memory banks, the memory bus incapable of transmitting the plurality of memory transactions simultaneously; identifying a plurality of bank readiness signals, each bank readiness signal indicating the readiness of one of the memory banks to accept a memory transaction; and selecting one of the memory transactions for transmission over the memory bus based on the bank readiness signals.

25 Claims, 18 Drawing Sheets

MEMORY BUS ARBITRATION USING MEMORY BANK READINESS

CROSS-REFERENCE TO RELATED APPLICATIONS

This application is a division of U.S. patent application Ser. No. 10/759,376, filed on Jan. 14, 2004, now U.S. Pat. No. 7,107,386, which is a continuation of U.S. patent application Ser. No. 09/925,158, filed Aug. 8, 2001, now abandoned.

BACKGROUND

The present invention relates generally to interconnection architecture, and particularly to interconnecting multiple processors with multiple shared memories.

Advances in the area of computer graphics algorithms have led to the ability to create realistic and complex images, scenes and films using sophisticated techniques such as ray tracing and rendering. However, many complex calculations must be executed when creating realistic or complex images. Some images may take days to compute even when using a computer with a fast processor and large memory banks. Multiple processor systems have been developed in an effort to speed up the generation of complex and realistic images. Because graphics calculations tend to be memory intensive applications, some multiple processor graphics systems are outfitted with multiple, shared memory banks. Ideally, a multiple processor, multiple memory bank system would have full, fast interconnection between the memory banks and processors. For systems with a limited number of processors and memory banks, a crossbar switch is an excellent choice for providing fast, full interconnection without introducing bottlenecks.

Shared memory banks often employ memory devices that use sophisticated addressing schemes having multiple states. Such devices include synchronous dynamic random access memories (SDRAMs). The device states generally include an available state and a busy (that is, unavailable) state. Conventional crossbar architectures do not take advantage of these states.

SUMMARY

In general, in one aspect, the invention features an apparatus. It includes a queue storing a plurality of memory transactions to be sent over a memory bus to a memory having a plurality of memory banks, each memory transaction addressed to one of the memory banks, the memory bus incapable of transmitting the plurality of memory transactions simultaneously; and an arbiter configured to identify a plurality of bank readiness signals, each bank readiness signal indicating the readiness of one of the memory banks to accept a memory transaction, and select one of the memory transactions for transmission over the memory bus based on the bank readiness signals.

Particular implementations can include one or more of the following features. Implementations include a memory controller configured to send the selected memory transaction over the memory bus. Implementations include a queue controller configured to associate with each of the memory transactions a different priority in a set of priorities; and wherein the arbiter is further configured to select the one of the memory transactions when the bank readiness signal indicates that the memory bank to which the one of the memory transactions is destined is ready to accept a memory transaction and the priority associated with the one of the memory transactions is greater than a priority associated with any of the other memory transactions. Each priority represents an age of a memory transaction. The arbiter is further configured to generate the bank readiness signals. The arbiter is further configured to send a memory transaction to a memory bank, clear the bank readiness signal for the memory bank at approximately the time of sending the memory transaction to the memory bank, and set the bank readiness signal for the memory bank a predetermined period of time after sending the memory transaction to the memory bank.

In general, in another aspect, the invention features a method, apparatus, and computer program product. It includes identifying a plurality of memory transactions to be sent over a memory bus to a memory having a plurality of memory banks, each memory transaction addressed to one of the memory banks, the memory bus incapable of transmitting the plurality of memory transactions simultaneously; identifying a plurality of bank readiness signals, each bank readiness signal indicating the readiness of one of the memory banks to accept a memory transaction; and selecting one of the memory transactions for transmission over the memory bus based on the bank readiness signals.

Particular implementations can include one or more of the following features. Implementations include sending the selected memory transaction over the memory bus. Each of the memory transactions is associated with a different priority in a set of priorities, and selecting further includes selecting the one of the memory transactions when the bank readiness signal indicates that the memory bank to which the one of the memory transactions is destined is ready to accept a memory transaction and the priority associated with the one of the memory transactions is greater than a priority associated with any of the other memory transactions. Implementations include associating the priorities with the memory transactions based on an age of the memory transactions. Implementations include generating the bank readiness signals. Generating includes sending a memory transaction to a memory bank; clearing the bank readiness signal for the memory bank at approximately the time of sending the memory transaction to the memory bank; and setting the bank readiness signal for the memory bank a predetermined period of time after sending the memory transaction to the memory bank.

Advantages that can be seen in implementations of the invention include one or more of the following. Implementations of the present inventions provide better utilization of memory bus than conventional techniques.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
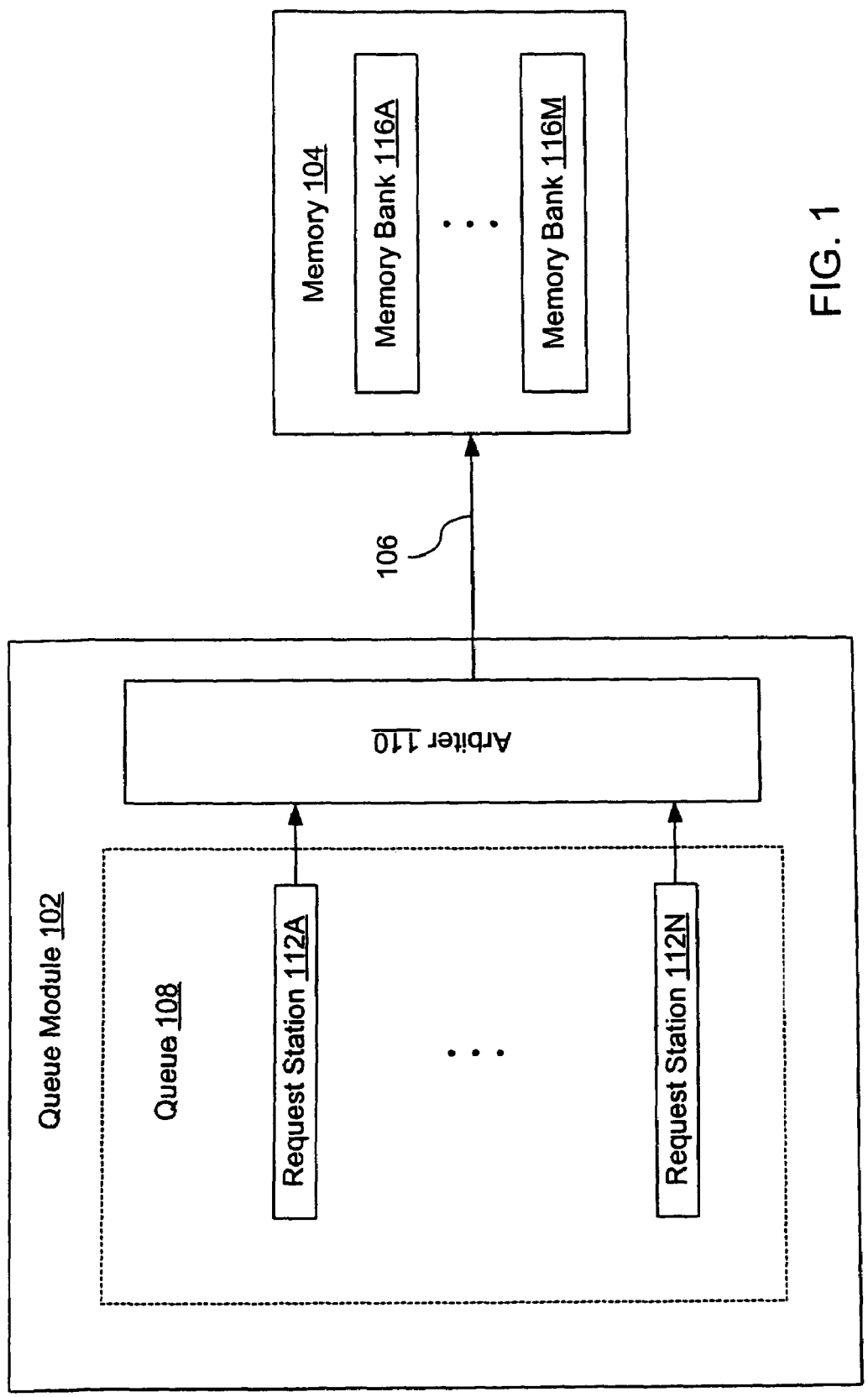
FIG. 1 is a block diagram of one implementation of the present invention.

In one implementation, a queue module 102 sends memory transactions to a memory 104 over a memory bus 106, as shown in FIG. 1. Queue module 102 includes a queue 108 and an arbiter 110. Queue 108 includes a plurality of request stations 112A through 112N. Memory 104 includes a plurality of memory banks 116A through 116M. Each memory bank 116 can be addressed separately. Request stations 112 can be implemented as registers. Arbiter 110 can be implemented using conventional Boolean logic devices. Memory 104 can be implemented using conventional memory devices such as synchronous dynamic random access memories (SDRAMs).

Each request station 112 stores a memory transaction destined for one of memory banks 116. However, memory bus 106 is incapable of transmitting more than one memory transaction simultaneously. Arbiter 110 selects one of the memory transactions based on the readiness of memory banks 116. In another implementation, memory bus 106 can transmit multiple memory transactions simultaneously, but cannot transmit all of the memory transactions contained in request stations 112 simultaneously.

Figure 2:
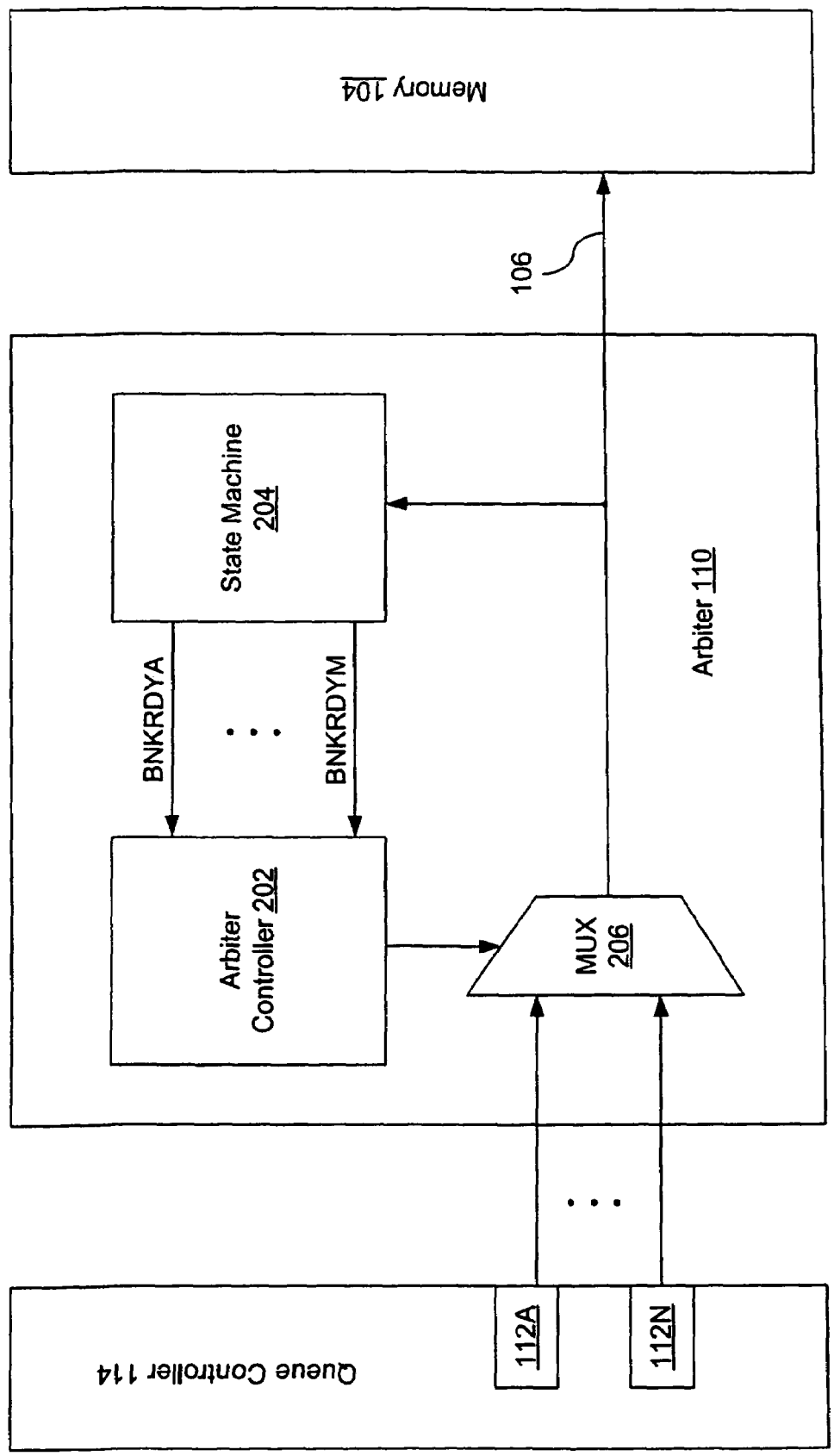
FIG. 2 is a block diagram of one implementation of the present invention showing details of an arbiter.

In one implementation, arbiter 110 includes an arbiter controller 202, a state machine 204, and a multiplexer (MUX) 206, as shown in FIG. 2. Arbiter controller 202 and state machine 204 can be implemented using conventional Boolean logic devices. Multiplexer 206 is coupled to each request station 112. Arbiter controller 202 causes multiplexer 206 to gate the contents (that is, a memory transaction) of one of the request stations 112 to memory 104 across memory bus 106 according to a plurality of bank readiness signals BNKRDYA through BNKRDYN.

Figure 3:
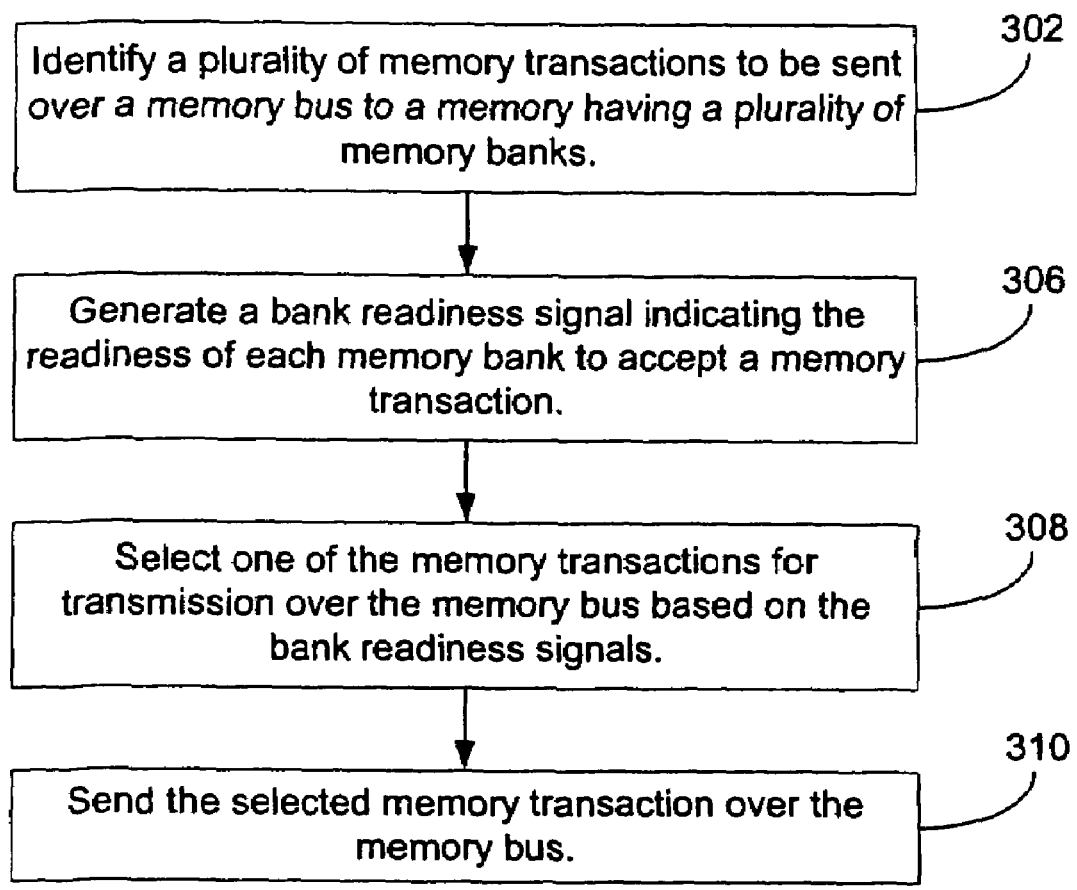
FIG. 3 is a flowchart of an operation performed by the arbiter according to one implementation.

FIG. 3 is a flowchart of an operation performed by arbiter 110 according to one implementation. Arbiter 110 identifies a plurality of memory transactions to be sent over memory bus 106 to memory 104 (step 302). Specifically, arbiter 110 identifies request stations 112.

State machine 204 monitors the addresses of the memory transactions that are gated to memory 104, and generates the bank readiness signals accordingly (step 306). When set (that is, asserted) each bank readiness signal indicates the availability of a corresponding memory bank 116 to accept a memory transaction. Each address indicates one of the memory banks 116. In particular, state machine 204 monitors each memory transaction gated across memory bus 106 to determine which memory bank 116 will receive that memory transaction. When a memory transaction is sent to a particular memory bank 116, state machine 204 clears the bank readiness signal for that memory bank 116, thereby indicating that that memory bank 116 is not available to accept another memory transaction. After a predetermined period of time has elapsed, state machine 204 sets the bank readiness signal for that memory bank 116, thereby indicating that that memory bank 116 is available to accept another memory transaction. The predetermined period of time is selected based on the characteristics of memory 104 and memory bus 106, as would be apparent to one skilled in the relevant arts.

Arbiter controller 202 selects one of the memory transactions for transmission over memory bus 106 based on the bank readiness signals (step 308). Specifically, arbiter controller 202 selects a request station 112 containing a memory transaction addressed to a memory bank 112 for which the corresponding bank readiness signal is set. If multiple request stations 112 contain memory transactions addressed to available memory banks 116, arbiter controller 202 uses a priority system to select one of those memory transactions. For example, each memory transaction can be assigned a priority level based on the age of that memory transaction. Arbiter controller 202 can favor older memory transactions, thereby ensuring that no memory transaction waits too long to be sent to memory 104.

Arbiter 110 sends the selected memory transaction over memory bus 106 by causing multiplexer 206 to gate the appropriate request station 112 to memory bus 106 (step 310).

Architecture Overview

Figure 4:
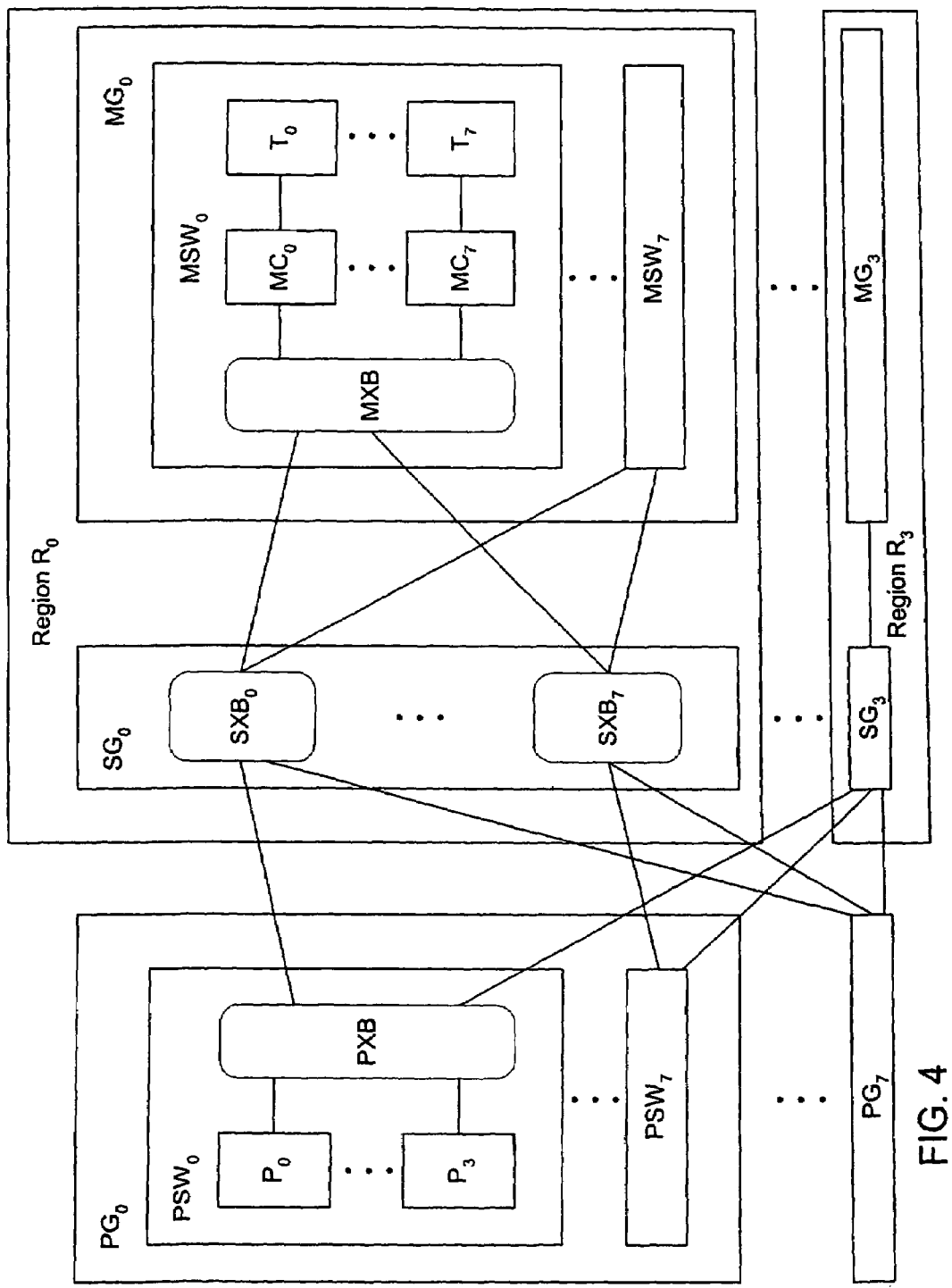
FIG. 4 illustrates an apparatus with which implementations of the present invention are useful.

FIG. 4 illustrates an apparatus with which implementations of the present invention are useful. As shown in FIG. 4, a plurality of processor groups $PG_0$ through $PG_7$ is connected to a plurality of regions $R_0$ through $R_3$. Each region R includes a memory group MG connected to a switch group SG. For example, region $R_0$ includes a memory group $MG_0$ connected to a switch group $SG_0$, while region $R_3$ includes a memory group $MG_3$ connected to a switch group $SG_3$.

Each processor group PG includes a plurality of processor switches $PSW_0$ through $PSW_7$. Each processor switch PSW includes a plurality of processors $P_0$ through $P_3$. Each processor P is connected to a processor crossbar PXB. In one implementation, each of processors $P_0$ through $P_3$ performs a different graphics rendering function. In one implementation, $P_0$ is a triangle processor, $P_1$ is a triangle intersector, $P_2$ is a ray processor, and $P_3$ is a grid processor.

Each switch group SG includes a plurality of switch crossbars $SXB_0$ through $SXB_7$. Each processor crossbar PXB is connected to one switch crossbar SXB in each switch group SG. Each switch crossbar SXB in a switch group SG is connected to a different processor crossbar PXB in a processor group PG. For example, the processor crossbar PXB in processor switch $PSW_0$ is connected to switch crossbar $SXB_0$ in switch group $SG_0$, while the processor crossbar in processor switch $PSW_7$ is connected to switch crossbar $SXB_7$ in switch group $SG_0$.

Each memory switch MSW includes a plurality of memory controllers $MC_0$ through $MC_7$. Each memory controller MC is connected to a memory crossbar MXB by an internal bus. Each memory controller MC is also connected to one of a plurality of memory tracks $T_0$ through $T_7$. Each memory track T includes a plurality of memory banks. Each memory track T can be implemented as a conventional memory device such as a SDRAM.

Each memory group MG is connected to one switch group SG. In particular, each memory crossbar MXB in a memory group MG is connected to every switch crossbar SXB in the corresponding switch group SG.

Processor crossbars PXB provide full crossbar interconnection between processors P and switch crossbars SXB. Memory crossbars MXB provide full crossbar interconnection between memory controllers MC and switch crossbars SXB. Switch crossbars SXB provide full crossbar interconnection between processor crossbars PXB and memory crossbars MXB.

In one implementation, each of processor switches PSW, memory switches MSW and switch crossbars SXB is fabricated as a separate semiconductor chip. In one implementation, each processor switch PSW is fabricated as a- single semiconductor chip, each switch crossbar SXB is fabricated as two or more semiconductor chips that operate in parallel, each memory crossbar MXB is fabricated as two or more semiconductor chips that operate in parallel, and each memory track T is fabricated as a single semiconductor chip. One advantage of each of these implementations is that the number of off-chip interconnects is minimized. Such implementations are disclosed in two related patent applications entitled "SLICED CROSSBAR ARCHITECTURE WITH INTER-SLICE COMMUNICATION," Ser. No. 09/927,306, filed Aug. 9, 2001, and issued on Nov. 29, 2005 as U.S. Pat. No. 6,970,454 and "SLICED CROSSBAR ARCHITECTURE WITH NO INTER-SLICE COMMUNICATION," Ser. No. 09/925,156, filed Aug. 8, 2001, and issued on Nov. 1, 2005 as U.S. Pat. No. 6,961,803.

Figure 5:
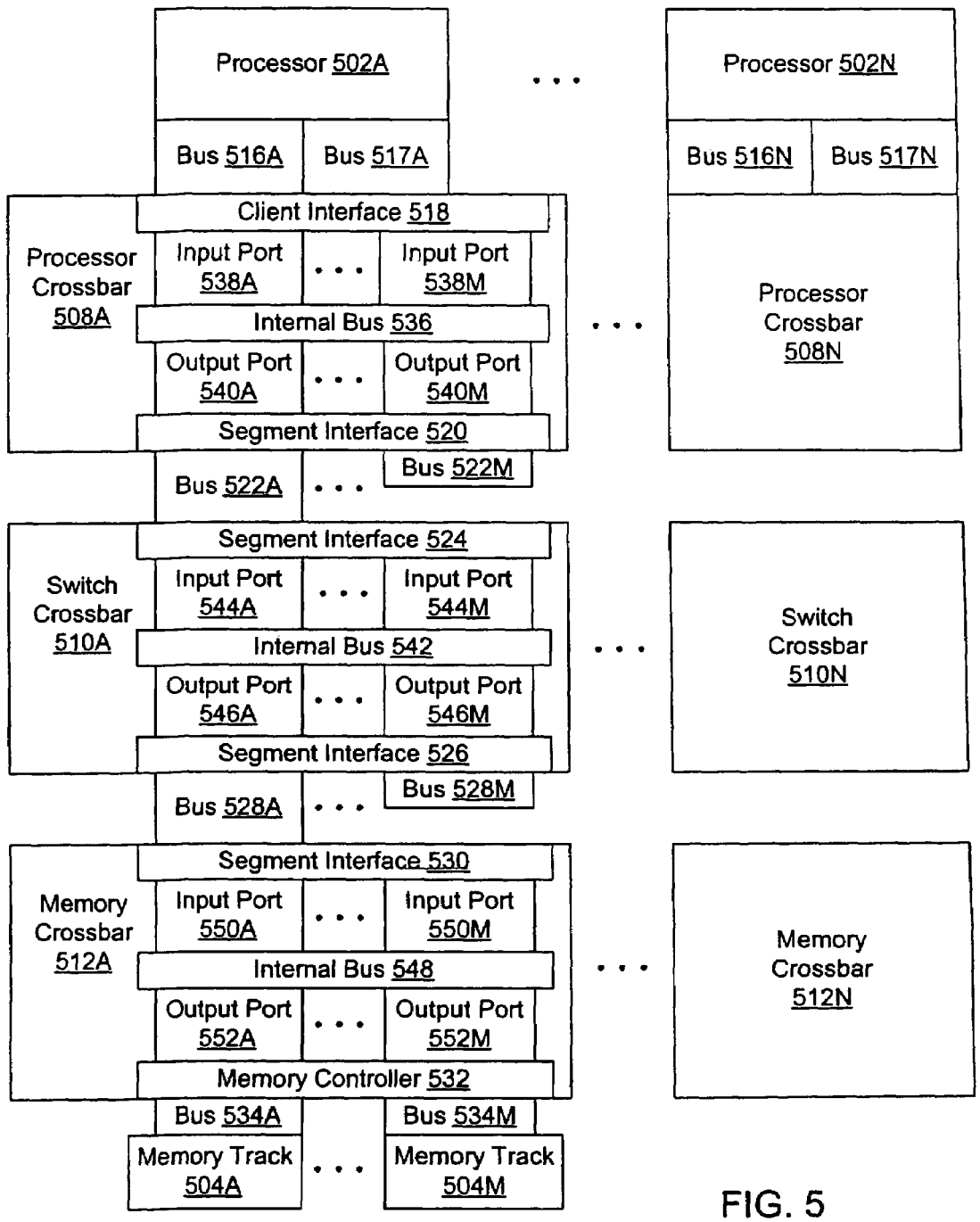
FIG. 5 shows a plurality of processors coupled to a plurality of memory tracks by a switch having three layers according to one implementation: a processor crossbar layer, a switch crossbar layer, and a memory crossbar layer.

Referring to FIG. 5, a plurality of processors 502A through 502N is coupled to a plurality of memory tracks 504A through 504M by a switch having three layers: a processor crossbar layer, a switch crossbar layer, and a memory crossbar layer. The processor crossbar layer includes a plurality of processor crossbars 508A through 508N. The switch crossbar layer includes a plurality of switch crossbars 510A through 510N. The memory crossbar layer includes a plurality of memory crossbars 512A through 512N. In one implementation, N=64. In other implementations, N takes on other values, and can take on different values for each type of crossbar.

Each processor 502 is coupled by a pair of busses 516 and 517 to one of the processor crossbars 508. For example, processor 502A is coupled by busses 516A and 517A to processor crossbar 508A. In a similar manner, processor 502N is coupled by busses 516N and 517N to processor crossbar 508N. In one implementation, each of busses 516 and 517 includes many point-to-point connections.

Each processor crossbar 508 includes a plurality of input ports 538A through 538M, each coupled to a bus 516 or 517 by a client interface 518. For example, client interface 518 couples input port 538A in processor crossbar 508A to bus 516A, and couples input port 538M in processor crossbar 508A to bus 517A. In one implementation, M=8. In other implementations, M takes on other values, and can take on different values for each type of port, and can differ from crossbar to crossbar.

Each processor crossbar 508 also includes a plurality of output ports 540A through 540M. Each of the input ports 538 and output ports 540 are coupled to an internal bus 536. In one implementation, each bus 536 includes many point-to-point collections. Each output port 540 is coupled by a segment interface 520 to one of a plurality of busses 522A through 522M. For example, output port 540A is coupled by segment interface 520 to bus 522A. Each bus 522 couples processor crossbar 508A to a different switch crossbar 510. For example, bus 522A couples processor crossbar 508A to switch crossbar 510A. In one implementation, busses 522 include many point-to-point connections.

Each switch crossbar 510 includes a plurality of input ports 544A through 544M, each coupled to a bus 522 by a segment interface 524. For example, input port 544A in switch crossbar 510A is coupled to bus 522A by segment interface 524.

Each switch crossbar 510 also includes a plurality of output ports 546A through 546M. Each of the input ports 544 and output ports 546 are coupled to an internal bus 542. In one implementation, each bus. 542 includes many point-to-point connections. Each output port 546 is coupled by a segment interface 526 to one of a plurality of busses 528A through 528M. For example, output port 546A is coupled by segment interface 526 to bus 528A. Each bus 528 couples switch crossbar 510A to a different memory crossbar 512. For example, bus 528A couples switch crossbar 510A to memory crossbar 512A. In one implementation, each of busses 528 includes many point-to-point connections.

Each memory crossbar 512 includes a plurality of input ports 550A through 550M, each coupled to a bus 528 by a segment interface 530. For example, input port 550A in memory crossbar 512A is coupled to bus 528A by segment interface 530.

Each memory crossbar 512 also includes a plurality of output ports 552A through 552M. Each of the input ports 550 and output ports 552 are coupled to an internal bus 548. In one implementation, each bus 548 includes many point-to-point connections. Each output port 552 is coupled by a memory controller 532 to one of a plurality of busses 534A through 534M. For example, output port 552A is coupled by memory controller 532 to bus 534A. Each of busses 534A through 534M couples memory crossbar 512A to a different one of memory tracks 504A through 504M. Each memory track 504 includes one or more synchronous dynamic random access memories (SDRAMs), as discussed below. In one implementation, each of busses 534 includes many point-to-point connections.

In one implementation, each of busses 516, 517, 522, 528, and 534 is a high-speed serial bus where each transaction can include one or more clock cycles. In another implementation, each of busses 516, 517, 522, 528, and 534 is a parallel bus. Conventional flow control techniques can be implemented across each of busses 516, 522, 528, and 534. For example, each of client interface 518, memory controller 532, and segment interfaces 520, 524, 526, and 530 can include buffers and flow control signaling according to conventional techniques.

In one implementation, each crossbar 508, 510, 512 is implemented as a separate semiconductor chip. In one implementation, processor crossbar 508 and processor 502 are implemented together as a single semiconductor chip. In one implementation, each of switch crossbar 510 and memory crossbar 512 is implemented as two or more chips that operate in parallel, as described below.

Processor

Figure 6:
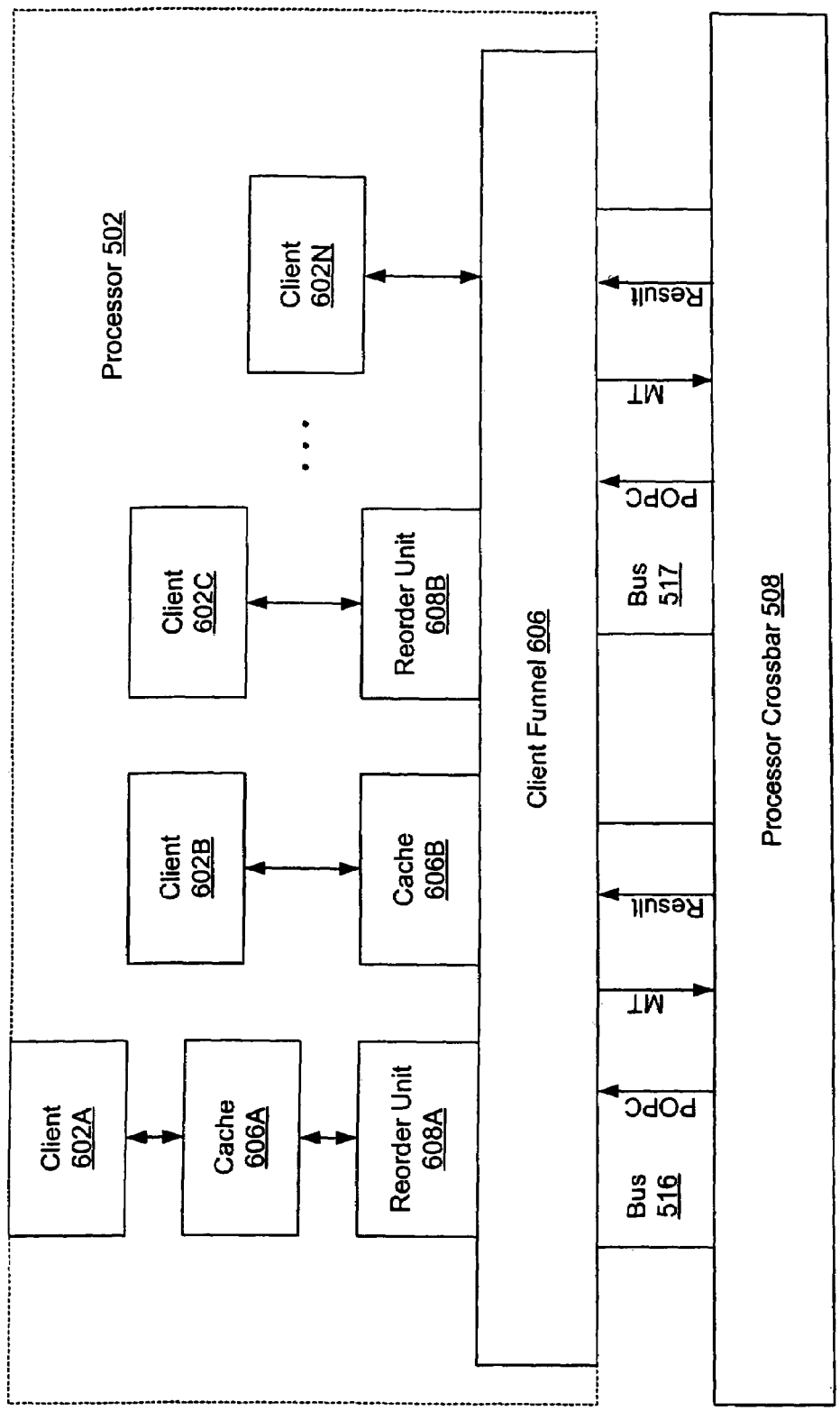
FIG. 6 shows a processor that includes a plurality of clients and a client funnel according to one implementation.

Referring to FIG. 6, in one implementation processor 502 includes a plurality of clients 602 and a client funnel 604. Each client 602 can couple directly to client funnel 604 or through one or both of a cache 606 and a reorder unit 608. For example, client 602A is coupled to cache 606A, which is coupled to reorder unit 608A, which couples to client funnel 604. As another example, client 602B is coupled to cache 606B, which couples to client funnel 604. As another example, client 602C couples to reorder unit 608B, which couples to client funnel 604. As another example, client 602N couples directly to client funnel 604.

Clients 602 manage memory requests from processes executing within processor 502. Clients 602 collect memory transactions (MT) destined for memory. If a memory transaction cannot be satisfied by a cache 606, the memory transaction is sent to memory. Results of memory transactions (Result) may return to client funnel 604 out of order. Reorder unit 608 arranges the results in order before passing them to a client 602.

Each input port 538 within processor crossbar 508 asserts a POPC signal when that input port 538 can accept a memory transaction. In response, client funnel 604 sends a memory transaction to that input port 538 if client funnel 604 has any memory transactions destined for that input port 538.

Processor Crossbar

Figure 7:
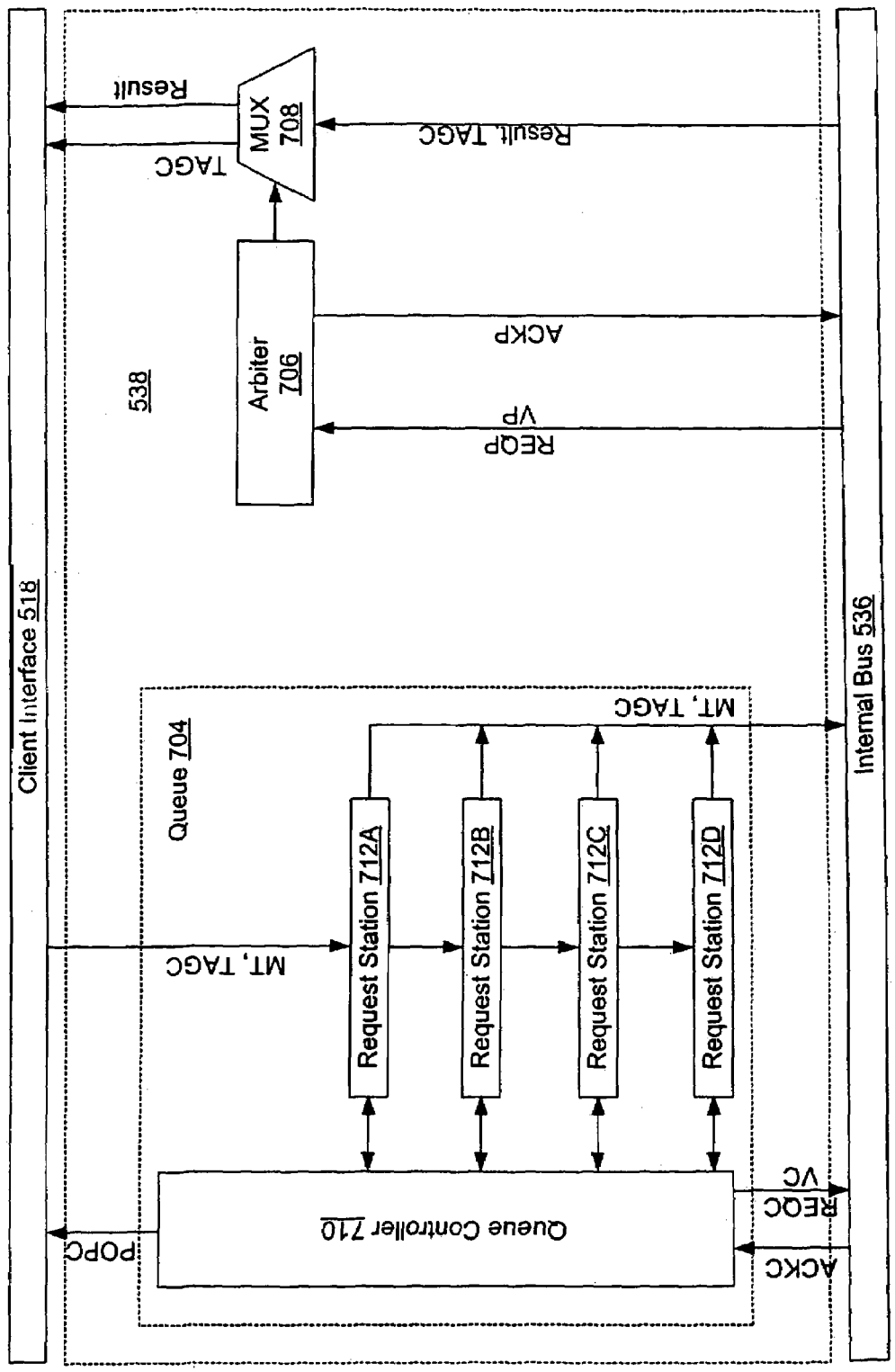
FIG. 7 shows an input port within a processor crossbar according to one implementation.

Referring to FIG. 7, an input port 538 within processor crossbar 508 includes a client interface 518, a queue 704, an arbiter 706, and a multiplexer (MUX) 708. Client interface 518 and arbiter 706 can be implemented using conventional Boolean logic devices.

Queue 704 includes a queue controller 710 and four request stations 712A, 712B, 712C, and 712D. In one implementation, request stations 712 are implemented as registers. In another implementation, request stations 712 are signal nodes separated by delay elements. Queue controller 710 can be implemented using conventional Boolean logic devices.

Now an example operation of input port 538 in passing a memory transaction from processor 502 to switch crossbar 510 will be described with reference to FIG. 7. For clarity it is assumed that all four of request stations 712 are valid. A request station 712 is valid when it currently stores a memory transaction that has not been sent to switch crossbar 510, and a TAGC produced by client funnel 604.

Internal bus 536 includes 64 data busses including 32 forward data busses and 32 reverse data busses. Each request station 712 in each input port 538 is coupled to a different one of the 32 forward data busses. In this way, the contents of all of the request stations 712 are presented on internal bus 536 simultaneously.

Each memory transaction includes a command and a memory address. Some memory transactions, such as write transactions, also include data. For each memory transaction, queue controller 710 asserts a request REQC for one of output ports 540 based on a portion of the address in that memory transaction. Queue controller 710 also asserts a valid signal VC for each request station 712 that currently stores a memory transaction ready for transmission to switch crossbar 510.

Each output port 540 chooses zero or one of the request stations 712 and transmits the memory transaction in that request station to switch crossbar 510, as described below. That output port 540 asserts a signal ACKC that tells the input port 538 which request station 712 was chosen. If one of the request stations 712 within input port 538 was chosen, queue controller 710 receives an ACKC signal. The ACKC signal indicates one of the request stations 712.

The request stations 712 within a queue 704 operate together substantially as a buffer. New memory transactions from processor 502 enter at request station 712A and progress towards request station 712D as they age until chosen by an output port. For example, if an output port 540 chooses request station 712B, then request station 712B becomes invalid and therefore available for a memory transaction from processor 502. However, rather than placing a new memory transaction in request station 712B, queue controller 710 moves the contents of request station 712A into request station 712B and places the new memory transaction in request station 712A. In this way, the identity of a request station serves as an approximate indicator of the age of the memory transaction. In one implementation, only one new memory transaction can arrive during each transaction time, and each memory transaction can age by only one request station during each transaction time. Each transaction time can include one or more clock cycles. In other implementations, age is computed in other ways.

When queue controller 710 receives an ACKC signal, it takes three actions. Queue controller 710 moves the contents of the "younger" request stations 712 forward, as described above, changes the status of any empty request stations 712 to invalid by disasserting VC, and sends a POPC signal to client interface 518. Client interface segment 518 forwards the POPC signal across bus 516 to client funnel 604, thereby indicating that input port 538 can accept a new memory transaction from client funnel 604.

In response, client funnel 604 sends a new memory transaction to the client interface 518 of that input port 538. Client funnel 604 also sends a tag TAGC that identifies the client 602 within processor 502 that generated the memory transaction.

Queue controller 710 stores the new memory transaction and the TAGC in request station 712A, and asserts signals VC and REQC for request station 712A. Signal VC indicates that request station 712A now has a memory transaction ready for transmission to switch crossbar 510. Signal REQC indicates through which output port 540 the memory transaction should pass.

Figure 8:
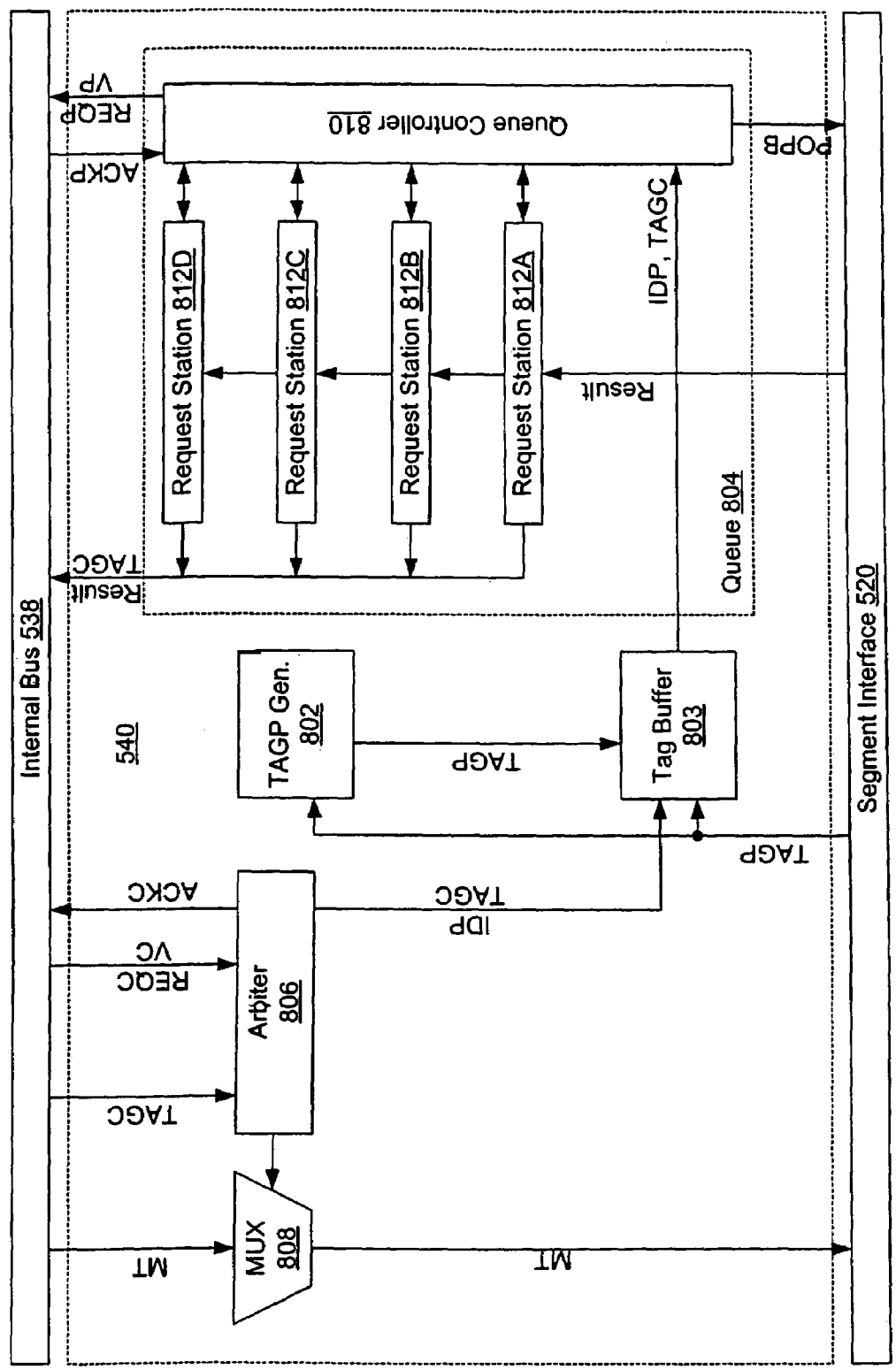
FIG. 8 shows an output port within a processor crossbar according to one implementation.

Referring to FIG. 8, an output port 540 within processor crossbar 508 includes a segment interface 520, a TAGP generator 802, a tag buffer 803, a queue 804, an arbiter 806, and a multiplexer 808. Tag generator 802 can be implemented as described below. Segment interface 520 and arbiter 806 can be implemented using conventional Boolean logic devices. Tag buffer 803 can be implemented as a conventional buffer.

Queue 804 includes a queue controller 810 and four request stations 812A, 812B, 812C, and 812D. In one implementation, request stations 812 are implemented as registers. In another implementation, request stations 812 are signal nodes separated by delay elements. Queue controller 810 can be implemented using conventional Boolean logic devices.

Now an example operation of output port 540 in passing a memory transaction from an input port 538 to switch crossbar 510 will be described with reference to FIG. 8. Arbiter 806 receives a REQC signal and a VC signal indicating that a particular request station 712 within an input port 538 has a memory transaction ready for transmission to switch crossbar 510. The REQC signal identifies the request station 712, and therefore, the approximate age of the memory transaction within that request station 712. The VC signal indicates that the memory transaction within that request station 712 is valid. In general, arbiter 806 receives such signals from multiple request stations 712 and chooses the oldest request station 712 for transmission.

Arbiter 806 causes multiplexer 808 to gate the memory transaction (MT) within the chosen request station 712 to segment interface 520. Arbiter 806 generates a signal IDP that identifies the input port 538 within which the chosen request station 712 resides. The identity of that input port 538 is derived from the REQC signal.

Tag generator 802 generates a tag TAGP according to the methods described below. Arbiter 806 receives the TAGC associated with the memory transaction. The IDP, TAGC, and TAGP are stored in tag buffer 803. In one implementation, any address information within the memory transaction that is no longer needed (that is, the address information that routed the memory transaction to output port 540) is discarded. In another implementation that address information is passed with the memory transaction to switch crossbar 510. Arbiter 806 asserts an ACKC signal that tells the input port 538 containing the chosen request station 712 that the memory transaction in that request station has been transmitted to switch crossbar 510.

Now an example operation of output port 540 in passing a result of a memory transaction from switch crossbar 510 to processor 502 will be described with reference to FIG. 8. For clarity it is assumed that all four of request stations 812 are valid. A request station 812 is valid when it currently stores a memory transaction that has not been sent to processor 502, and a TAGC and IDP retrieved from tag buffer 803.

As mentioned above, internal bus 536 includes 32 reverse data busses. Each request station 812 in each output port 540 is coupled to a different one of the 32 reverse data busses. In this way, the contents of all of the request stations 812 are presented on internal bus 536 simultaneously.

Some results, such as a result of a read transaction, include data. Other results, such as a result for a write transaction, include an acknowledgement but no data. For each result, queue controller 810 asserts a request REQP for one of input ports 538 based on IDP. As mentioned above, IDP indicates the input port 538 from which the memory transaction prompting the result originated. Queue controller 810 also asserts a valid signal VP for each request station 812 that currently stores a result ready for transmission to processor 502.

Each input port 538 chooses zero or one of the request stations 812 and transmits the result in that request station to processor 502, as described below. That input port 538 asserts a signal ACKP that tells the output port 540 which request station 812 within that output port was chosen. If one of the request stations 812 within output port 540 was chosen, queue controller 810 receives an A CKP signal. The A CKP signal indicates one of the request stations 812.

The request stations 812 within a queue 804 operate together substantially as a buffer. New results from processor 502 enter at request station 812A and progress towards request station 812D until chosen by an input port 538. For example, if an input port 538 chooses request station 812B, then request station 812B becomes invalid and therefore available for a new result from switch crossbar 510. However, rather than placing a new result in request station 812B, queue controller 810 moves the contents of request station 812A into request station 812B and places the new result in request station 812A. In this way, the identity of a request station 812 serves as an approximate indicator of the age of the result. In one implementation, only one new memory transaction can arrive during each transaction time, and each memory transaction can age by only one request station during each transaction time. In other implementations, age is computed in other ways.

When queue controller 810 receives an ACKP signal, it takes three actions. Queue controller 810 moves the contents of the "younger" request stations forward, as described above, changes the status of any empty request stations to invalid by disasserting VP, and sends a POPB signal to segment interface 520 segment interface 520 forwards the POPB signal across bus 522 to switch crossbar 510, thereby indicating that output port 540 can accept a new result from switch crossbar 510.

In response, switch crossbar 510 sends a new result, and a TAGP associated with that result, to the segment interface 520 of that output port 540. The generation of TAGP, and association of that TAGP with the result, are discussed below with reference to FIG. 9.

Tag buffer 803 uses the received TAGP to retrieve the IDP and TAGC associated with that TAGP. TAGP is also returned to TAGP generator 802 for use in subsequent transmissions across bus 522.

Queue controller 810 stores the new result, the TAGP, and the IDP in request station 812A, and asserts signals VP and REQP for request station 812A. Signal VP indicates that request station 812A now has a result ready for transmission to processor 502. Signal REQP indicates through which input port 538 the result should pass.

Now an example operation of input port 538 in passing a result from an output port 540 to processor 502 will be described with reference to FIG. 7. Arbiter 706 receives a REQP signal and a VP signal indicating that a particular request station 812 within an output port 540 has a result ready for transmission to processor 502. The REQP signal identifies the request station 812, and therefore, the approximate age of the result within that request station 812. The VP signal indicates that the memory transaction within that request station 812 is valid. In general, arbiter 706 receives such signals from multiple request stations 812 and chooses the oldest request station 812 for transmission.

Arbiter 706 causes multiplexer 708 to gate the result and associated TAGC to client interface 518. Arbiter 706 also asserts an ACKP signal that tells the output port 540 containing the chosen request station 812 that the result in that request station has been transmitted to processor 502.

Switch Crossbar

Figure 9:
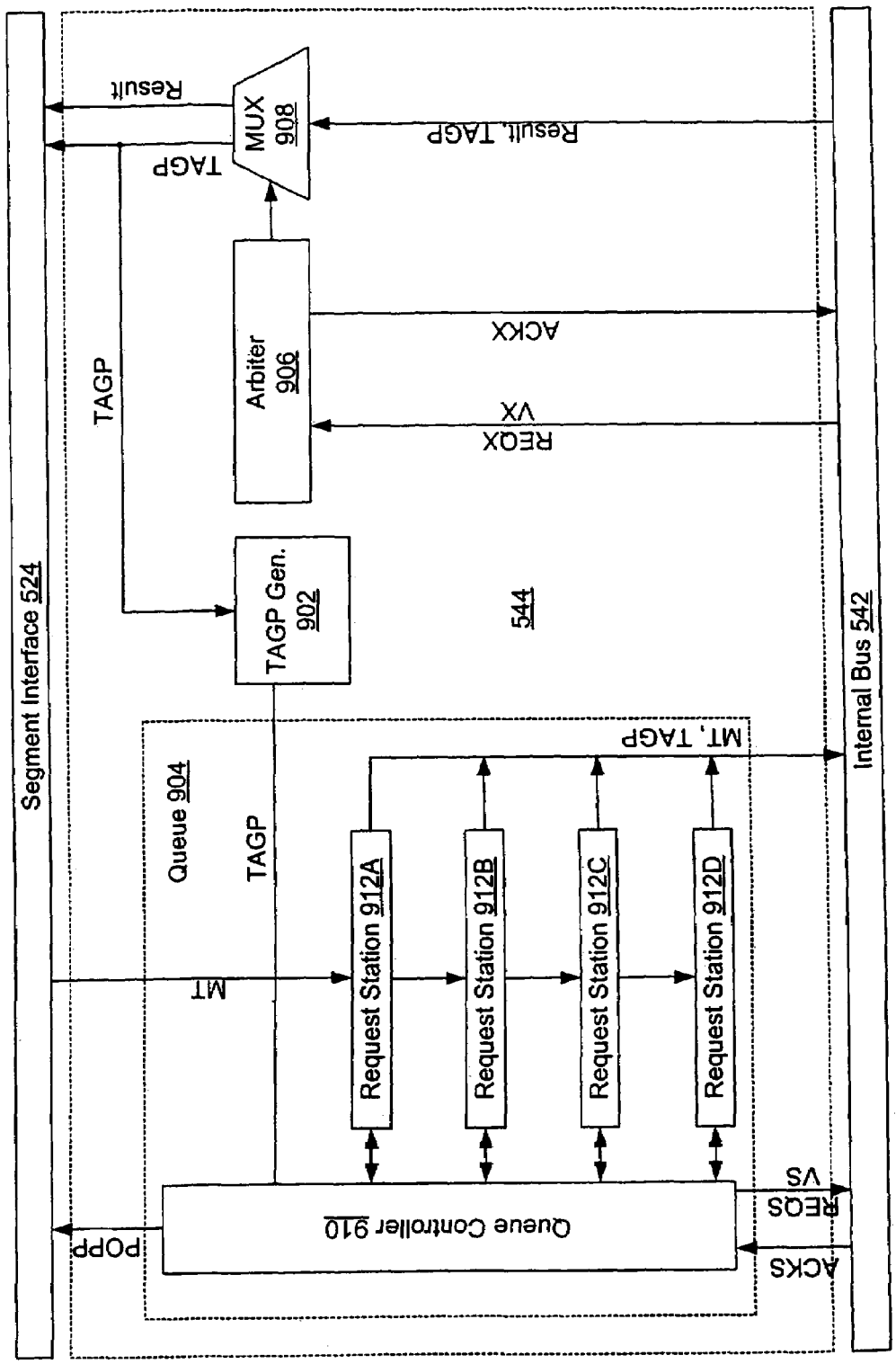
FIG. 9 shows an input port within a switch crossbar according to one implementation.

Referring to FIG. 9, an input port 544 within switch crossbar 510 includes a segment interface 524, a TAGP generator 902, a queue 904, an arbiter 906, and a multiplexer 908. TAGP generator 902 can be implemented as described below. Segment interface 524 and arbiter 906 can be implemented using conventional Boolean logic devices.

Queue 904 includes a queue controller 910 and four request stations 912A, 912B, 912C, and 912D. In one implementation, request stations 912 are implemented as registers. In another implementation, request stations 912 are signal nodes separated by delay elements. Queue controller 910 can be implemented using conventional Boolean logic devices.

Now an example operation of input port 544 in passing a memory transaction from processor crossbar 508 to memory crossbar 512 will be described with reference to FIG. 9. For clarity it is assumed that all four of request stations 912 are valid. A request station 912 is valid when it currently stores a memory transaction that has not been sent to memory crossbar 512, and a TAGP produced by TAGP generator 902.

Internal bus 542 includes 64 data busses including 32 forward data busses and 32 reverse data busses. Each request station 912 in each input port 544 is coupled to a different one of the 52 forward data busses. In this way, the contents of all of the request stations 912 are presented on internal bus 542 simultaneously.

Each memory transaction includes a command and a memory address. Some memory transactions, such as write transactions, also include data. For each memory transaction, queue controller 910 asserts a request REQS for one of output ports 546 based on a portion of the address in that memory transaction. Queue controller 910 also asserts a valid signal VS for each request station 912 that currently stores a memory transaction ready for transmission to memory crossbar 512.

Each output port 546 chooses zero or one of the request stations 912 and transmits the memory transaction in that request station to memory crossbar 512, as described below. That output port 546 asserts a signal ACKS that tells the input port 544 which request station 912 was chosen. If one of the request stations 912 within input port 544 was chosen, queue controller 910 receives an ACKS signal. The ACKS signal indicates one of the request stations 912.

The request stations 912 within a queue 904 operate together substantially as a buffer. New memory transactions from processor crossbar 508 enter at request station 912A and progress towards request station 912D as they age until chosen by an output port. For example, if an output port 546 chooses request station 912B, then request station 912B becomes invalid and therefore available for a memory transaction from processor crossbar 508. However, rather than placing a new memory transaction in request station 912B, queue controller 910 moves the contents of request station 912A into request station 912B and places the new memory transaction in request station 912A. In this way, the identity of a request station serves as an approximate indicator of the age of the memory transaction. In one implementation, only one new memory transaction can arrive during each transaction time, and each memory transaction can age by only one request station during each transaction time. In other implementations, age is computed in other ways.

When queue controller 910 receives an ACKS signal, it takes three actions. Queue controller 910 moves the contents of the "younger" request stations 912 forward, as described above, changes the status of any empty request stations 912 to invalid by disasserting VS, and sends a POPP signal to segment interface 524. Segment interface 524 forwards the POPP signal across bus 522 to processor crossbar 508, thereby indicating that input port 544 can accept a new memory transaction from processor crossbar 508.

In response, processor crossbar 508 sends a new memory transaction to the segment interface 524 of that input port 544. TAGP generator 902 generates a TAGP for the memory transaction. Tag generators 902 and 802 are configured to independently generate the same tags in the same order, and are initialized to generate the same tags at substantially the same time, as discussed below. Therefore, the TAGP generated by TAGP generator 902 for a memory transaction has the same value as the TAGP generated for that memory transaction by TAGP generator 802. Thus the tagging technique of this implementation allows a result returned from memory tracks 504 to be matched at processor 502 with the memory transaction that produced that result.

Queue controller 910 stores the new memory transaction and the TAGP in request station 912A, and asserts signals VS and REQS for request station 912A. Signal VS indicates that request station 912A now has a memory transaction ready for transmission to memory crossbar 512. Signal REQS indicates through which output port 546 the memory transaction should pass.

Figure 10:
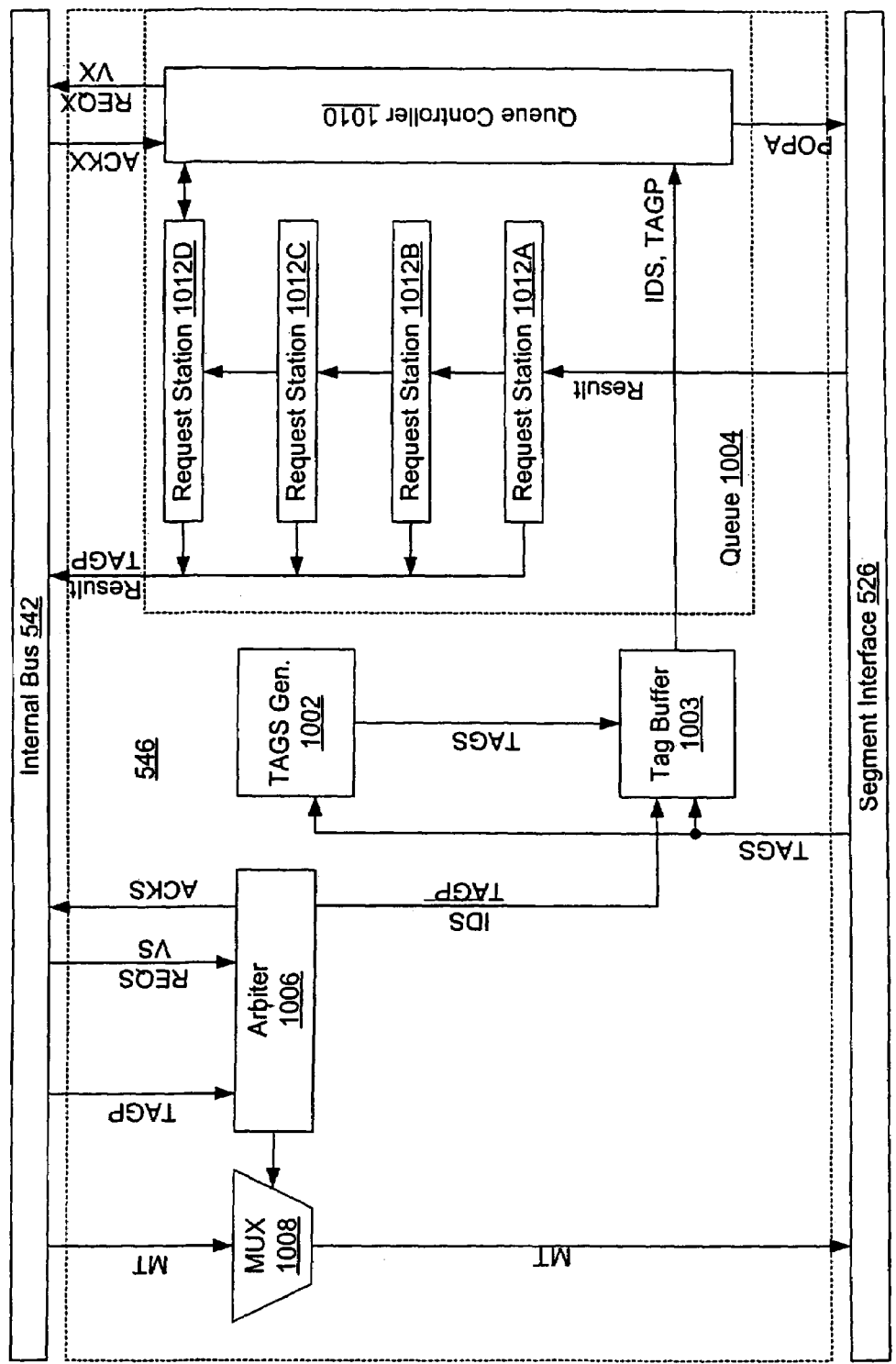
FIG. 10 shows an output port within a switch crossbar according to one implementation.

Referring to FIG. 10, an output port 546 within switch crossbar 510 includes a segment interface 526, a TAGS generator 1002, a tag buffer 1003, a queue 1004, an arbiter 1006, and a multiplexer 1008. TAGS generator 1002 can be implemented as described below. Segment interface 526 and arbiter 1006 can be implemented using conventional Boolean logic devices. Tag buffer 1003 can be implemented as a conventional buffer.

Queue 1004 includes a queue controller 1010 and four request stations 1012A, 1012B, 1012C, and 1012D. In one implementation, request stations 1012 are implemented as registers. In another implementation, request stations 1012 are signal nodes separated by delay elements. Queue controller 1010 can be implemented using conventional Boolean logic devices.

Now an example operation of output port 546 in passing a memory transaction from an input port 544 to memory crossbar 512 will be described with reference to FIG. 10. Arbiter 1006 receives a REQS signal and a VS signal indicating that a particular request station 912 within an input port 544 has a memory transaction ready for transmission to memory crossbar 512. The REQS signal identifies the request station 912, and therefore, the approximate age of the memory transaction within that request station 912. The VS signal indicates that the memory transaction within that request station 912 is valid. In general, arbiter 1006 receives such signals from multiple request stations 912 and chooses the oldest request station 912 for transmission.

Arbiter 1006 causes multiplexer 1008 to gate the memory transaction (MT) within the chosen request station 912 to segment interface 526. Arbiter 1006 generates a signal. IDS that identifies the input port 544 within which the chosen request station 912 resides. The identity of that input port 544 is derived from the REQC signal.

TAGS generator 1002 generates a tag TAGS according to the methods described below. Arbiter 1006 receives the TAGP associated with the memory transaction. The IDS, TAGP, and TAGS are stored in tag buffer 1003. In one implementation, any address information within the memory transaction that is no longer needed (that is, the address information that routed the memory transaction to output port 546) is discarded. In another implementation that address information is passed with the memory transaction to memory crossbar 512. Arbiter 1006 asserts an ACKS signal that tells the input port 544 containing the chosen request station 912 that the memory transaction in that request station has been transmitted to memory crossbar 512.

Now an example operation of output port 546 in passing a result of a memory transaction from memory crossbar 512 to processor crossbar 508 will be described with reference to FIG. 10. For clarity it is assumed that all four of request stations 1012 are valid. A request station 1012 is valid when it currently stores a memory transaction that has not been sent to processor crossbar 508, and a TAGP and IDS retrieved from tag buffer 1003.

As mentioned above, internal bus 542 includes 32 reverse data busses. Each request station 1012 in each output port 546 is coupled to a different one of the 32 reverse data busses. In this way, the contents of all of the request stations 1012 are presented on internal bus 542 simultaneously.

Some results, such as a result of a read transaction, include data. Other results, such as a result for a write transaction, include an acknowledgement but no data. For each result, queue controller 1010 asserts a request REQX for one of input ports 544 based on IDS. As mentioned above, IDS indicates the input port 544 from which the memory transaction prompting the result originated. Queue controller 1010 also asserts a valid signal VX for each request station 1012 that currently stores a result ready for transmission to processor crossbar 508.

Each input port 544 chooses zero or one of the request stations 1012 and transmits the result in that request station to processor crossbar 508, as described below. That input port 544 asserts a signal ACKX that tells the output port 546 which request station 1012 within that output port was chosen. If one of the request stations 1012 within output port 546 was chosen, queue controller 1010 receives an ACKX signal. The ACKX signal indicates one of the request stations 1012.

The request stations 1012 within a queue 1004 operate together substantially as a buffer. New results from processor crossbar 508 enter at request station 1012A and progress towards request station 1012D until chosen by an input port 544. For example, if an input port 544 chooses request station 1012B, then request station 1012B becomes invalid and therefore available for a new result from memory crossbar 512. However, rather than placing a new result in request station 1012B, queue controller 1010 moves the contents of request station 1012A into request station 1012B and places the new result in request station 1012A. In this way, the identity of a request station 1012 serves as an approximate indicator of the age of the result. In one implementation, only one new memory transaction can arrive during each transaction time, and each memory transaction can age by only one request station during each transaction time. In other implementations, age is computed in other ways.

When queue controller 1010 receives an ACKX signal, it takes three actions. Queue controller 1010 moves the contents of the "younger" request stations forward, as described above, changes the status of any empty request stations to invalid, and sends a POPA signal to segment interface 526. Segment interface 526 forwards the POPA signal across bus 522 to memory crossbar 512, thereby indicating that output port 546 can accept a new result from memory crossbar 512.

In response, memory crossbar 512 sends a new result, and a TAGS associated with that result, to the segment interface 526 of that output port 546. The generation of TAGS, and association of that TAGS with the result, are discussed below with reference to FIG. 11

Tag buffer 1003 uses the received TAGS to retrieve the IDS and TAGP associated with that TAGS. TAGS is also returned to TAGS generator 1002 for use in subsequent transmissions across bus 528.

Queue controller 1010 stores the new result, the TAGP, and the IDS in request station 1012A, and asserts signals VX and REQX for request station 1012A. Signal VX indicates that request station 1012A now has a result ready for transmission to processor crossbar 508. Signal REQX indicates through which input port 544 the result should pass.

Now an example operation of input port 544 in passing a result from an output port 546 to processor crossbar 508 will be described with reference to FIG. 9. Arbiter 906 receives a REQX signal and a VX signal indicating that a particular request station 1012 within an output port 546 has a result ready for transmission to processor crossbar 508. The REQX signal identifies the request station 1012, and therefore, the approximate age of the result within that request station 1012. The VX signal indicates that the memory transaction within that request station 1012 is valid. In general, arbiter 906 receives such signals from multiple request stations 1012 and chooses the oldest request station 1012 for transmission.

Arbiter 906 causes multiplexer 908 to gate the result and associated TAGP to segment interface 524, and to return the TAGP to TAGP generator 902 for use with future transmissions across bus 522. Arbiter 906 also asserts an ACKX signal that tells the output port 546 containing the chosen request station 1012 that the result in that request station has been transmitted to processor crossbar 508.

Memory Crossbar

Figure 11:
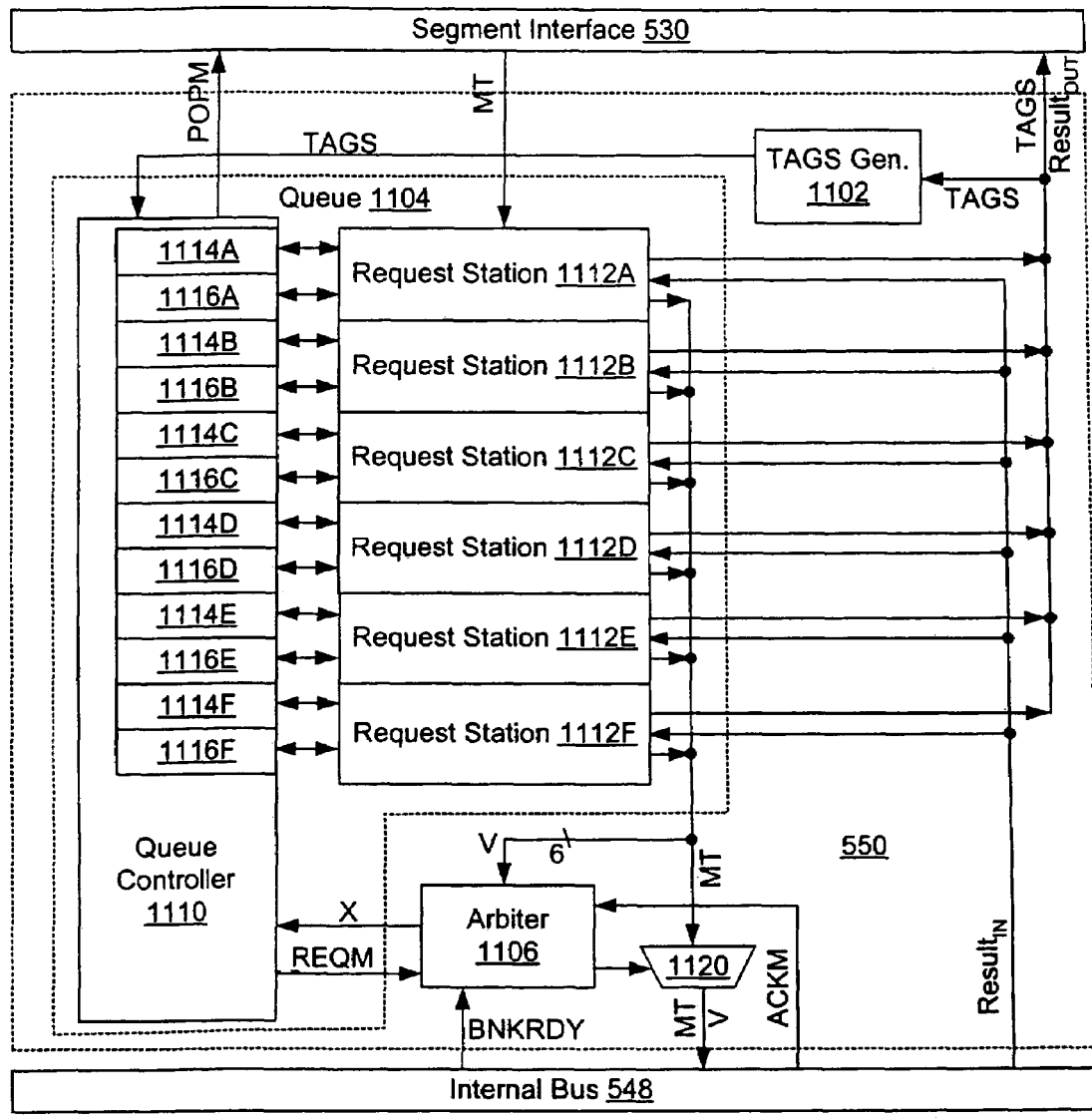
FIG. 11 shows an input port within a memory crossbar according to one implementation.

Referring to FIG. 11, an input port 550 within memory crossbar 512 is connected to a segment interface 530 and an internal bus 548, and includes a TAGS generator 1102, a queue 1104, an arbiter 1106, and multiplexer (MUX) 1120. TAGS generator 1102 can be implemented as described below. Segment interface 530 and arbiter 1106 can be implemented using conventional Boolean logic devices. Queue 1104 includes a queue controller 1110 and six request stations 1112A, 1112B, 1112C, 1112D, 1112E, and 1112F. Queue controller 1110 includes a forward controller 1114 and a reverse controller 1116 for each request station 1112. Forward controllers 1114 include forward controllers 1114A, 1114B, 1114C, 1114D, 1114E, and 1114F. Reverse controllers 1116 include forward controllers 1116A, 1116B, 1116C, 1116D, 1116E, and 1116F. Queue controller 1110, forward controllers 1114 and reverse controllers 1116 can be implemented using conventional Boolean logic devices.

Now an example operation of input port 550 in passing a memory transaction from switch crossbar 510 to a memory track 504 will be described with reference to FIG. 11. For clarity it is assumed that all six of request stations 1112 are valid. A request station 1112 is valid when it currently stores a memory transaction that has not been sent to a memory track 504, and a TAGS produced by TAGS generator 1102.

The request stations 1112 within a queue 1104 operate together substantially as a buffer. New memory transactions from switch crossbar 510 enter at request station 1112A and progress towards request station 1112F until chosen by an output port 552. For example, if an output port 552 chooses request station 1112B, then request station 1112B becomes invalid and therefore available for a memory transaction from switch crossbar 510. However, rather than placing a new memory transaction in request station 1112B, queue controller 1110 moves the contents of request station 1112A into request station 1112B and places the new memory transaction in request station 1112A. In this way, the identity of a request station serves as an approximate indicator of the age of the memory transaction. In one implementation, only one new memory transaction can arrive during each transaction time, and each memory transaction can age by only one request station during each transaction time. In other implementations, age is computed in other ways.

For each memory transaction, queue controller 1110 asserts a request REQM for one of output ports 552 based on a portion of the address in that memory transaction. Queue controller 1110 also asserts a valid signal V for each request station that currently stores a memory transaction ready for transmission to memory tracks 504.

Internal bus 542 includes 64 separate two-way private busses. Each private bus couples one input port 550 to one output port 552 so that each input port has a private bus with each output port.

Each arbiter 1106 includes eight pre-arbiters (one for each private bus). Each multiplexer 1120 includes eight pre-multiplexers (one for each private bus). Each pre-arbiter causes a pre-multiplexer to gate zero or one of the request stations 1112 to the private bus connected to that pre-multiplexer. In this way, an input port 550 can present up to six memory transactions on internal bus 548 simultaneously.

A pre-arbiter selects one of the request stations based on several criteria. The memory transaction must be valid. This information is given by the V signal. The memory transaction in the request station must be destined to the output port 552 served by the pre-arbiter. This information is given by the REQM signal. The memory bank addressed by the memory transaction must be ready to accept a memory transaction. The status of each memory bank is given by a BNKRDY signal generated by output ports 552, as described below. The pre-arbiter considers the age of each memory transaction as well. This information is given by the identity of the request station 1112.

Each output port 552 sees eight private data busses, each presenting zero or one memory transactions from an input port 550. Each output port 552 chooses zero or one of the memory transactions and transmits that memory transaction to memory controller 532, as described below. That output port 552 asserts a signal ACKM that tells the input port 550 which bus, and therefore which input port 550, was chosen. If one of the request stations 1112 within input port 550 was chosen, the pre-arbiter for that bus receives an ACKM signal. The ACKM signal tells the pre-arbiter that the memory transaction presented on the bus served by that pre-arbiter was transmitted to memory. The pre-arbiter remembers which request station 1112 stored that memory transaction, and sends a signal X to queue controller 1110 identifying that request station 1112.

Queue controller 1110 takes several actions when it receives a signal X. Queue controller 1110 moves the contents of the "younger" request stations forward, as described above, changes the status of any empty request stations to invalid by disasserting V, and moves the TAGS for the memory transaction just sent into a delay unit 1108.

Queue controller 1110 also sends a POPM signal to segment interface 530. Segment interface 530 forwards the POPM signal across bus 528 to switch crossbar 510, thereby indicating that input port 550 can accept a new memory transaction from switch crossbar 510.

In response, switch crossbar 510 sends a new memory transaction to the segment interface 530 of that input port 550. TAGS generator 1102 generates a TAGS for the memory transaction. TAGS generators 1102 and 1002 are configured to independently generate the same tags in the same order, and are initialized to generate the same tags at substantially the same time, as discussed below. Therefore, the TAGS generated by TAGS generator 1102 for a memory transaction has the same value as the TAGS generated for that memory transaction by TAGS generator 1002. Thus the tagging technique of this implementation allows a result returned from memory tracks 504 to be returned to the process that originated the memory transaction that produced that result.

Queue controller 1110 stores the new memory transaction and the TAGS in request station 1112A, and asserts signals V and REQM. Signal V indicates that request station 1112A now has a memory transaction ready for transmission to memory tracks 504. Signal REQM indicates through which input port 544 the result should pass.

Figure 12:
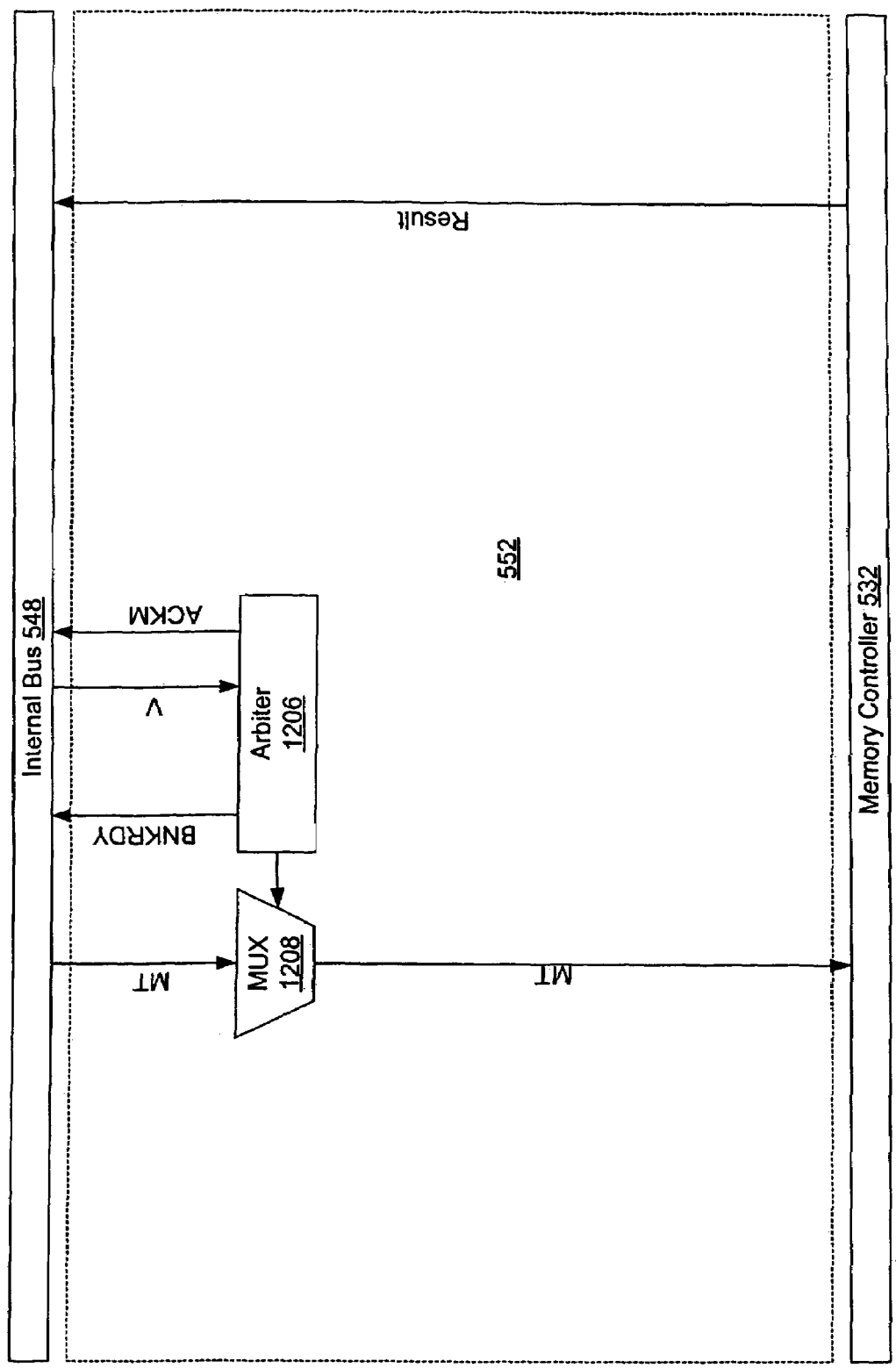
FIG. 12 shows an output port within a memory crossbar according to one implementation.

Referring to FIG. 12, an output port 552 within memory crossbar 512 includes a memory controller 532, an arbiter 1206, and a multiplexer 1208. Memory controller 532 and arbiter 1206 can be implemented using conventional Boolean logic devices.

Now an example operation of output port 552 in passing a memory transaction from an input port 550 to a memory track 504 will be described with reference to FIG. 12. Arbiter 1206 receives one or more signals V each indicating that a request station 1112 within an input port 550 has presented a memory transaction on its private bus with that output port 552 for transmission to memory tracks 504. The V signal indicates that the memory transaction within that request station 1112 is valid. In one implementation, arbiter 1206 receives such signals from multiple input ports 550 and chooses one of the input ports 550 based on a fairness scheme.

Arbiter 1206 causes multiplexer 1208 to gate the memory transaction presented by the chosen input port 550 to memory controller 532. Arbiter 1206 asserts an ACKM signal that tells the input port 550 containing the chosen request station 1112 that the memory transaction in that request station has been transmitted to memory tracks 504.

Now an example operation of output port 552 in passing a result of a memory transaction from memory tracks 504 to switch crossbar 510 will be described with reference to FIG. 12. When a result arrives at memory controller 532, memory controller 532 sends the result (Result$_{IN}$) over internal bus 548 to the input port 550 that transmitted the memory transaction that produced that result. Some results, such as a result of a read transaction, include data. Other results, such as a result for a write transaction, include an acknowledgement but no data.

Now an example operation of input port 550 in passing a result from an output port 552 to switch crossbar 510 will be described with reference to FIG. 11. Each result received over internal bus 548 is placed in the request station from which the corresponding memory transaction was sent. Each result and corresponding TAGS progress through queue 1104 towards request station 1112F until selected for transmission to switch crossbar 510.

Figure 13:
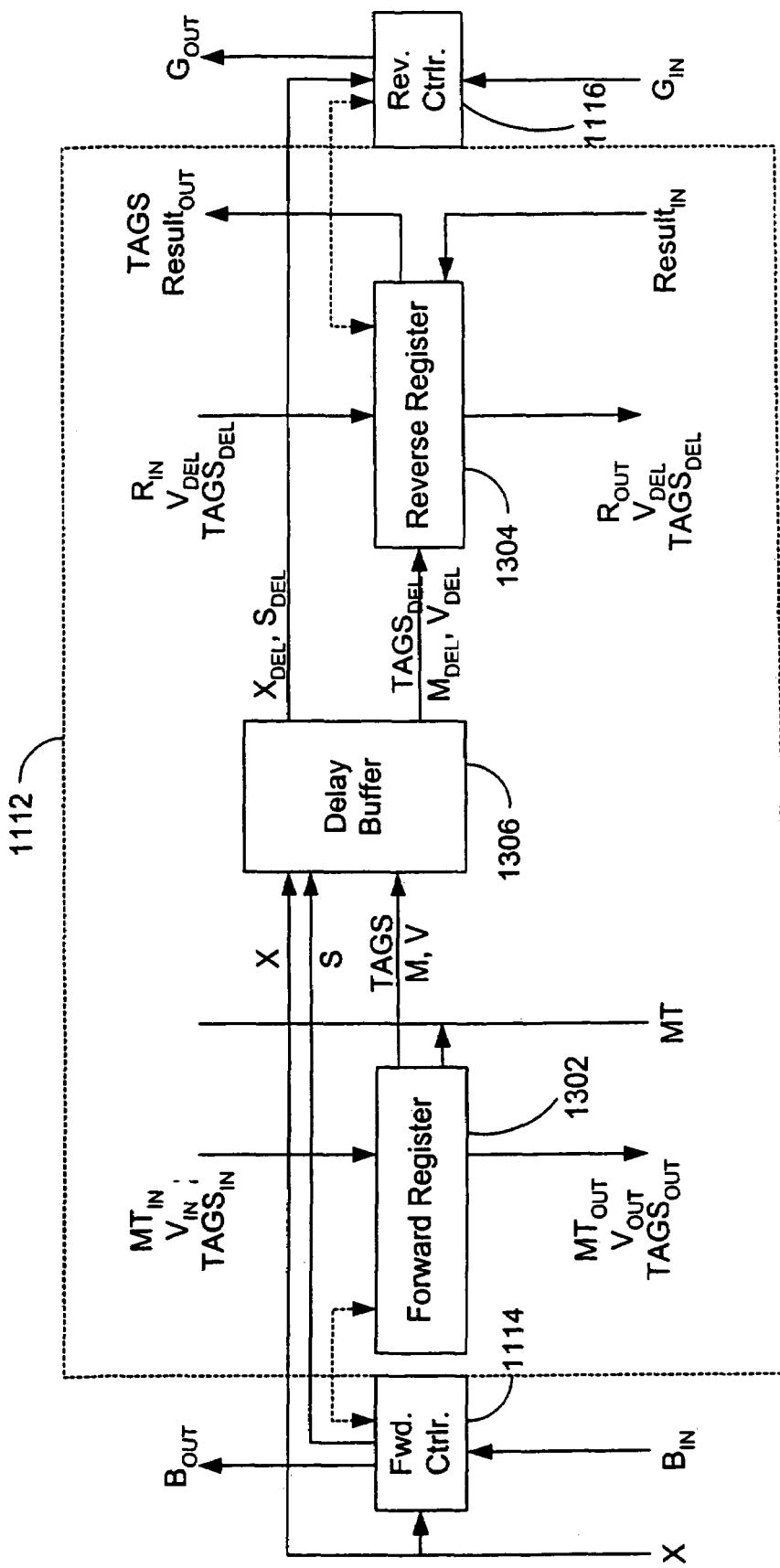
FIG. 13 depicts a request station according to one implementation.

FIG. 13 depicts a request station 1112 according to one implementation. Request station 1112 includes a forward register 1302, a reverse register 1304, and a delay buffer 1306. Forward register 1302 is controlled by a forward controller 1114. Reverse register 1304 is controlled by a reverse controller 1116.

Queue 1104 operates according to transaction cycles. A transaction cycle includes a predetermined number of clock cycles. Each transaction cycle queue 1104 may receive a new memory transaction (MT) from a switch crossbar 510. As described above, new memory transactions (MT) are received in request station 1112A, and age through queue 1104 each transaction cycle until selected by a signal X. Request station 1112A is referred to herein as the "youngest" request station, and includes the youngest forward and reverse controllers, the youngest forward and reverse registers, and the youngest delay buffer. Similarly, request station 1112F is referred to herein as the "oldest" request station, and includes the oldest forward and reverse controllers, the oldest forward and reverse registers, and the oldest delay buffer.

The youngest forward register receives new memory transactions (MT$_{IN}$) from switch crossbar 510. When a new memory transaction MT$_{IN}$ arrives in the youngest forward register, the youngest forward controller sets the validity bit V$_{IN}$ for the youngest forward register and places a tag TAGS from tag generator 1102 into the youngest forward register. In this description a bit is set by making it a logical one ("1") and cleared by making it a logical zero ("0").

When set, signal X indicates that the contents of forward register 1302 have been transmitted to a memory track 504.

Each forward controller 1114 generates a signal B$_{OUT}$ every transaction cycle where $$B_{OUT} = VB_{IN}\overline{X} \quad (1)$$

where B$_{OUT}$ is used by a younger forward register as B$_{IN}$ and B$_{IN}$=0 for the oldest forward register.

Each forward controller 1114 shifts into its forward register 1302 the contents of an immediately younger forward register when:

$$S=1 \quad (2)$$

where $$S=\overline{V}+X+\overline{B}_{IN} \quad (3)$$

where V indicates that the contents of the forward register 1302 are valid and X indicates that the memory transaction in that forward register 1302 has been placed on internal bus 548 by arbiter 1106. Note that X is only asserted for a forward register 1302 when that forward register is valid (that is, when the validity bit V is set for that forward register). The contents of each forward register include a memory transaction MT, a validity bit V, and a tag TAGS.

Referring to FIG. 13, the contents being shifted into forward register 1302 from an immediately younger forward register are denoted $MT_{IN}$, $V_{IN}$, and $TAGS_{IN}$, while the contents being shifted out of forward register 1302 to an immediately older forward register are denoted $MT_{OUT}$, $V_{OUT}$, and $TAGS_{OUT}$.

The validity bit V for each forward register 1302 is updated each transaction cycle according to $$V = \overline{VXS} + SV_{IN} \quad (4)$$

Each forward controller 1114 copies TAGS, V, and M from its forward register 1302 into its delay buffer 1306 every transaction cycle. M is the address of the request station 1112. Each forward controller 1114 also copies X and S into its delay buffer 1306 every transaction cycle. Each delay buffer 1306 imposes a predetermined delay on its contents that is equal to the known predetermined time that elapses between sending a memory transaction to a memory track 504 and receiving a corresponding result from that memory track 504.

Each transaction cycle, an $X_{DEL}$, $V_{DEL}$, $S_{DEL}$, $M_{DEL}$, and $TAGS_{DEL}$ emerge from delay buffer 1306. $X_{DEL}$ is X delayed by delay buffer 1306. $V_{DEL}$ is V delayed by delay buffer 1306. $S_{DEL}$ is S delayed by delay buffer 1306. When $X_{DEL}$ is set, reverse register 1304 receives a result $Result_{IN}$ selected according to $M_{DEL}$ from a memory track 504, and a $TAGS_{DEL}$, $V_{DEL}$ and $S_{DEL}$ from delay buffer 1306, the known predetermined period of time after sending the corresponding memory transaction from forward register 1302 to that memory track 504.

Each transaction cycle, reverse controller 1116 generates a signal $G_{OUT}$ where $$G_{OUT} = V_{DEL} G_{IN} \quad (5)$$

where $G_{OUT}$ is used by a younger reverse register as $G_{IN}$ and $G_{IN}=1$ for the oldest reverse register.

A reverse register 1304 sends its contents (a result $Result_{OUT}$ and a tag TAGS) to switch crossbar 510 when $$\overline{V_{DEL}} G_{IN} = 1 \quad (6)$$

Each reverse controller 1116 shifts into its reverse register 1304 the contents of an immediately younger reverse register when:

$$S_{DEL} = 1 \quad (7)$$

The contents of each reverse register include a result Result, a tag $TAGS_{DEL}$, and delayed validity bit $V_{DEL}$. Referring to FIG. 13, the result being shifted into reverse register 1304 from an immediately younger reverse register is denoted $R_{IN}$, while the result being shifted out of reverse register 1304 to an immediately older reverse register is denoted $R_{OUT}$.

Memory Arbitration

Figure 14:
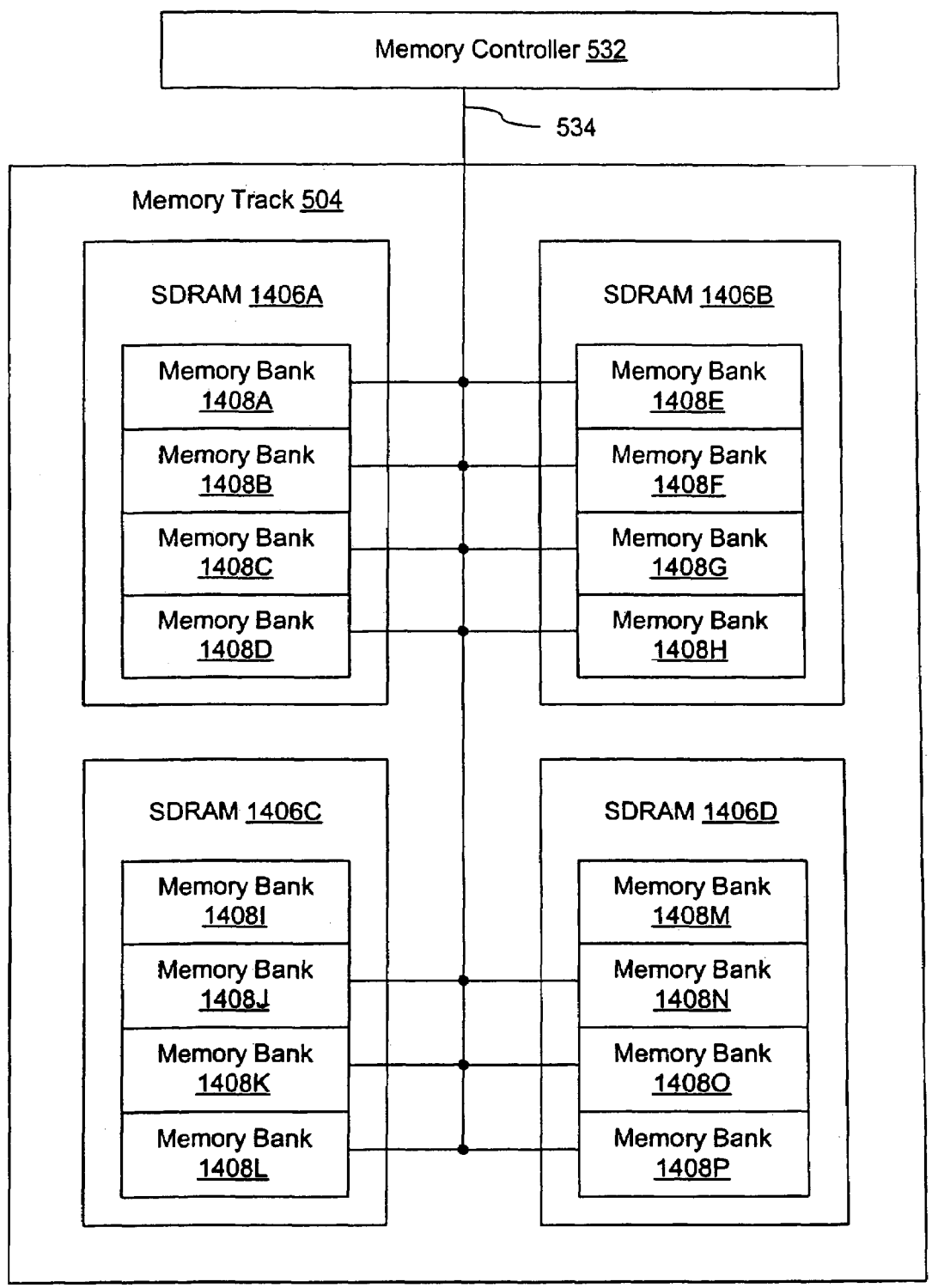
FIG. 14 depicts a memory track according to one implementation.

Each memory controller 532 controls a memory track 504 over a memory bus 534. Referring to FIG. 14, each memory track 504 includes four SDRAMs 1406A, 1406B, 1406C, and 1406D. Each SDRAM 1406 includes four memory banks 1408. SDRAM 1406A includes memory banks 1408A, 1408B, 1408C, and 1408D. SDRAM 1406B includes memory banks 1408E, 1408F, 1408G, and 1408H. SDRAM 1406C includes memory banks 1408I, 1408J, 1408K, and 1408L. SDRAM 1406D includes memory banks 1408M, 1408N, 1408O, and 1408P.

The SDRAMs 1406 within a memory track 504 operate in pairs to provide a double-wide data word. For example, memory bank 1408A in SDRAM 1406A provides the least-significant bits of a data word, while memory bank 1408E in SDRAM 1406B provides the most significant bits of that data word.

Memory controller 532 operates efficiently to extract the maximum bandwidth from memory track 504 by exploiting two features of SDRAM technology. First, the operations of the memory banks 1408 of a SDRAM 1406 can be interleaved in time to hide overhead such as precharge and access time. Second, the use of autoprecharge makes the command and data traffic equal. For an SDRAM, an eight-byte transfer operation requires two commands (activate and read/write) and two data transfers (four clock phases).

Figure 15:
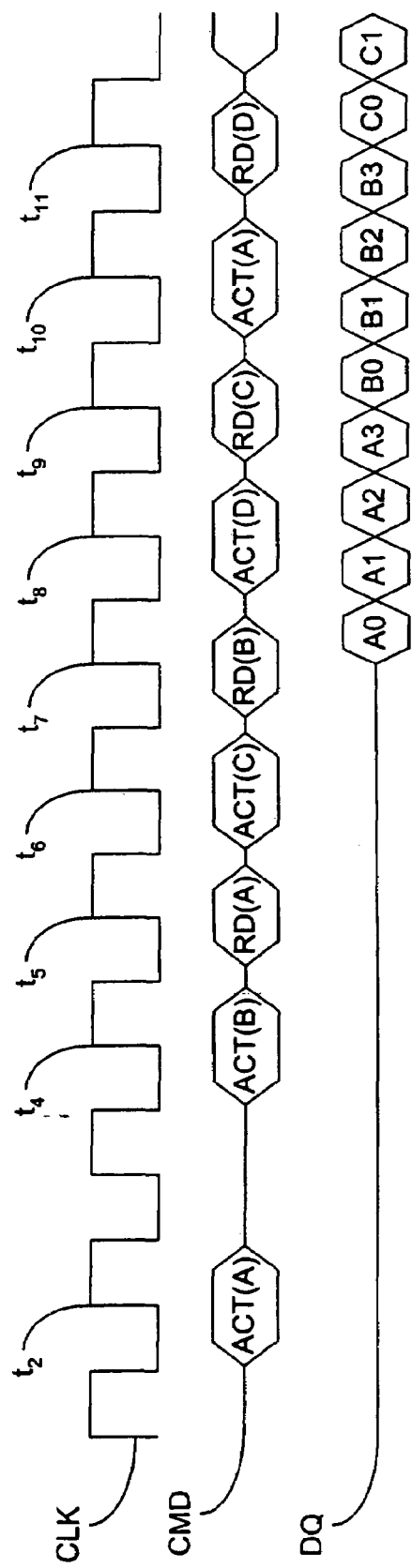
FIG. 15 depicts three timelines for an example operation of an SDRAM according to one implementation.

FIG. 15 depicts three timelines for an example operation of SDRAM 1406A. A clock signal CLK operates at a frequency compatible with SDRAM 1406A. A command bus CMD transports commands to SDRAM 1406A across memory bus 534. A data bus DQ transports data to and from SDRAM 1406A across memory bus 534.

FIG. 15 depicts the timing of four interleaved read transactions. The interleaving of other commands such as write commands will be apparent to one skilled in the relevant arts after reading this description. SDRAM 1406A receives an activation command ACT(A) at time $t_2$. The activation command prepares bank 1408A of SDRAM 1406A for a read operation. The receipt of the activation command also begins an eight-clock period during which bank 1408A is not available to accept another activation.

During this eight-clock period, SDRAM 1406A receives a read command RD(A) at $t_5$. SDRAM 1406A transmits the data A0, A1, A2, A3 requested by the read command during the two clock cycles between times $t_7$ and $t_9$. SDRAM 1406A receives another activation command ACT(A) at time $t_{10}$.

Three other read operations are interleaved with the read operation just described. SDRAM 1406A receives an activation command ACT(B) at time $t_4$. The activation command prepares bank 1408B of SDRAM 1406A for a read operation. The receipt of the activation command also begins an eight-clock period during which bank 1408B is not available to accept another activation.

During this eight-clock period, SDRAM 1406A receives a read command RD(B) at $t_7$. SDRAM 1406A transmits the data B0, B1, B2, B3 requested by the read command during the two clock cycles between times $t_9$ and $t_{11}$.

SDRAM 1406A receives an activation command ACT(C) at time $t_6$. The activation command prepares bank 1408C of SDRAM 1406A for a read operation. The receipt of the activation command also begins an eight-clock period during which bank 1408C is not available to accept another activation.

During this eight-clock period, SDRAM 1406A receives a read command RD(C) at $t_9$. SDRAM 1406A transmits the data C0, C1, and so forth, requested by the read command during the two clock cycles beginning with $t_{11}$.

SDRAM 1406A receives an activation command ACT(D) at time $t_8$. The activation command prepares bank 1408D of SDRAM 1406A for a read operation. The receipt of the activation command also begins an eight-clock period during which bank 1408D is not available to accept another activation.

During this eight-clock period, SDRAM 1406A receives a read command RD(D) at $t_{11}$. SDRAM 1406A transmits the data requested by the read command during two subsequent clock cycles in a manner similar to that describe above. As shown in FIG. 15, three of the eight memory banks 1408 of a memory track 504 are unavailable at any given time, while the other five memory banks 1408 are available.

Figure 16:
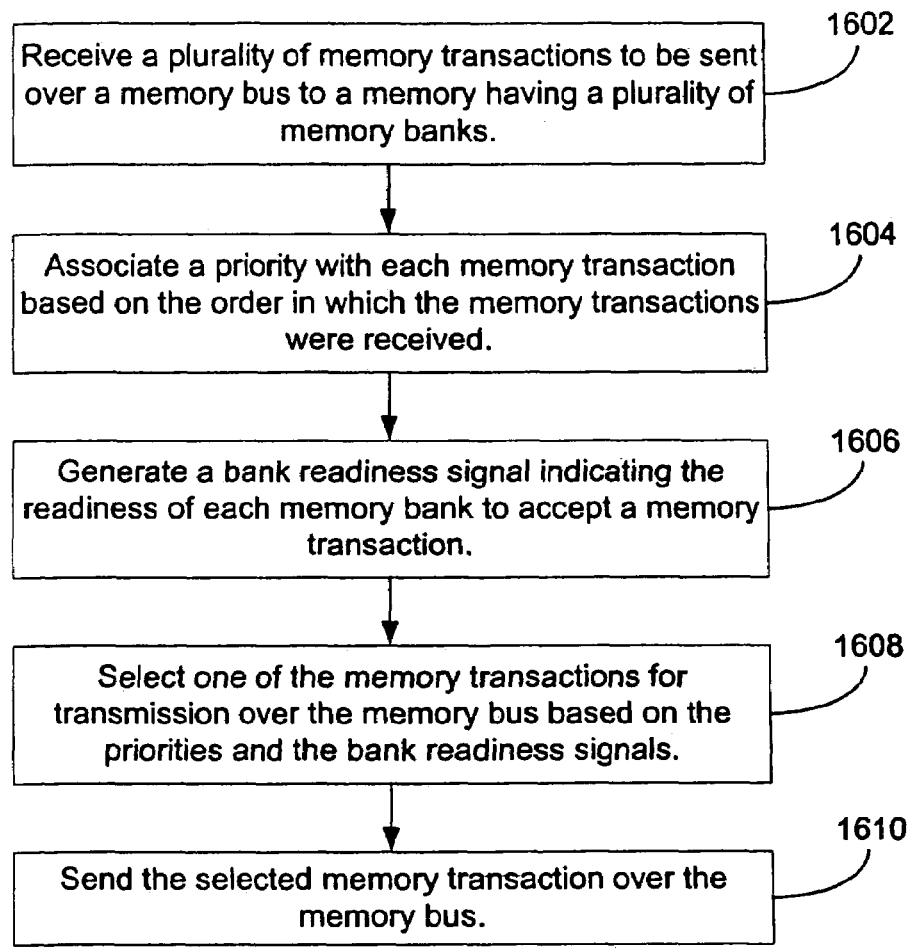
FIG. 16 is a flowchart depicting an example operation of a memory crossbar in sending memory transactions to a memory track based on the availability of memory banks within tie memory track according to one implementation.

FIG. 16 is a flowchart depicting an example operation of memory crossbar 512 in sending memory transactions to a memory track 504 based on the availability of memory banks 1408. As described above, each input port 550 within memory crossbar 512 receives a plurality of memory transactions to be sent over a memory bus 534 to a memory track 504 having a plurality of memory banks 1408 (step 1602). Each memory transaction is addressed to one of the memory banks. However, each memory bus 534 is capable of transmitting only one memory transaction at a time.

Each input port 550 associates a priority with each memory transaction based on the order in which the memory transactions were received at that input port 550 (step 1604). In one implementation priorities are associated with memory transactions through the use of forward queue 1104 described above. As memory transactions age, they progress from the top of the queue (request station 1112A) towards the bottom of the queue (request station 1112F). The identity of the request station 1112 in which a memory transaction resides indicates the priority of the memory transaction. Thus the collection of the request stations 1112 within an input port 550 constitutes a set of priorities where each memory transaction has a different priority in the set of priorities.

Arbiter 1206 generates a signal BNKRDY for each request station 1112 based on the availability to accept a memory transaction of the memory bank 1208 to which the memory transaction within that request station 1112 is addressed (step 1606). Each BNKRDY signal tells the request station 1112 whether the memory bank 1408 to which its memory transaction is addressed is available.

Arbiter 1206 includes a state machine or the like that tracks the availability of memory banks 1408 by monitoring the addresses of the memory transactions gated to memory controller 532. When a memory transaction is sent to a memory bank 1408, arbiter 1206 clears the BNKRDY signal for that memory bank 1408, thereby indicating that that memory bank 1408 is not available to accept a memory transaction.

After a predetermined period of time has elapsed, arbiter 1206 sets the BNKRDY signal for that memory bank 1408, thereby indicating that that memory bank 1408 is available to accept a memory transaction.

As described above, the BNKRDY signal operates to filter the memory transactions within request stations 1112 so that only those memory transactions addressed to available memory banks 1408 are considered by arbiter 1106 for presentation on internal bus 548. Also as described above, arbiter 1206 selects one of the memory transactions presented on internal bus 548 using a fairness scheme. Thus memory crossbar 512 selects one of the memory transactions for transmission over memory bus 534 based on the priorities and the bank readiness signals (step 1608). Finally, memory crossbar 512 sends the selected memory transaction over memory bus 534 to memory tracks 504 (step 1610).

Tag Generator

As mentioned above, the pair of tag generators associated with a bus are configured to independently generate the same tags in the same order. For example, tag generators 802 and 902 are associated with bus 522, and tag generators 1002 and 1102 are associated with bus 528.

In one implementation, the tag generators are buffers. The buffers are initialized by loading each buffer with a set of tags such that both buffers contain the same tags in the same order and no tag in the set is the same as any other tag in the set. In One implementation each buffer is a first-in, first-out (FIFO) buffer. In that implementation, tags are removed by "popping" them from the FIFO, and are returned by "pushing" them on to the FIFO.

In another implementation, each of the tag generators is a counter. The counters are initialized by setting both counters to the same value. Each tag is an output of the counter. In one implementation, the counter is incremented each time a tag is generated. If results return across a bus in the same order in which the corresponding memory transactions were sent across the bus, then the maximum count of the counter can be set to account for the maximum number of places (such as registers and the like) that a result sent across a bus and the corresponding memory transaction returning across the bus can reside.

However, if results do not return across a bus in the same order in which the corresponding memory transactions were sent across the bus, a control scheme is used. For example, each count can be checked to see whether it is still in use before generating a tag from that count. If the count is still in use, the counter is frozen (that is, not incremented) until that count is no longer in use. As another example, a count that is still in use can be skipped (that is, the counter is incremented but a tag is not generated from the count). Other such implementations are contemplated.

In another implementation, the counters are incremented continuously regardless of whether a tag is generated. In this way, each count represents a time stamp for the tag. The maximum count of each counter is set according to the maximum possible round trip time for a result and the corresponding memory transaction. In any of the counter implementations, the counters can be decremented rather than incremented.

Figure 17:
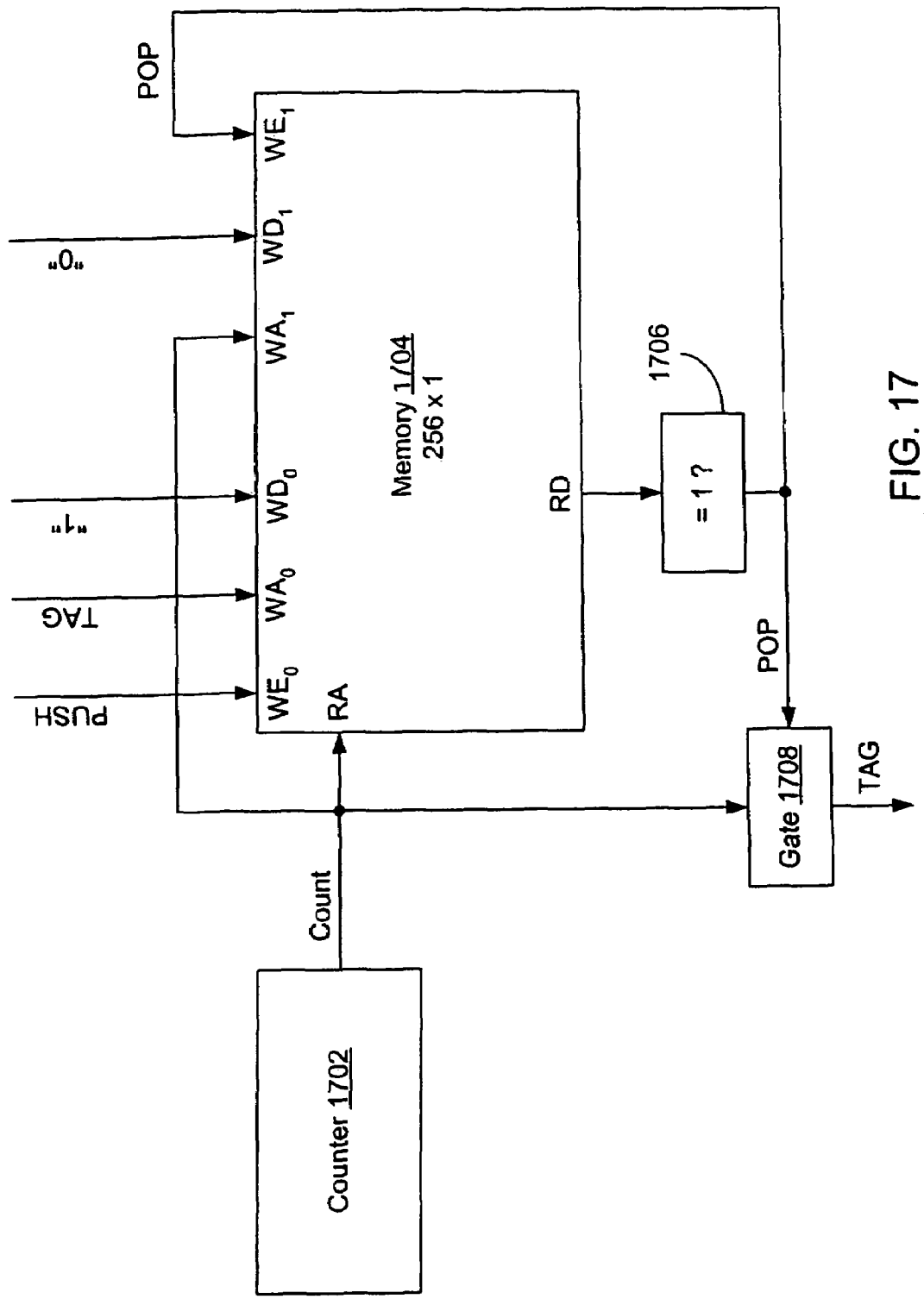
FIG. 17 depicts a tag generator according to one implementation.

In another implementation, depicted in FIG. 17, each of the tag generators includes a counter 1702 and a memory 1704. Memory 1704 is a two-port memory that is one bit wide. The depth of the memory is set according to design requirements, as would be apparent to one skilled in the relevant arts. The contents of memory 1704 are initialized to all ones before operation.

The read address (RA) of memory 1704 receives the count output of counter 1702. In this way, counter 1702 "sweeps" memory 1704. The data residing at each address is tested by a comparator 1706. A value of "1" indicates that the count is available for use as a tag. A value of "1" causes comparator 1706 to assert a POP signal. The POP signal causes gate 1708 to gate the count out of the tag generator for use as a tag. The POP signal is also presented at the write enable pin for port one (WE1) of memory 1704. The write data pin of port one (WD1) is hardwired to logic zero ("0"). The write address pins of port one receive the count. Thus when a free tag is encountered that tag is generated and marked "in-use." When a tag is returned to the tag generator, its value is presented at the write address pins for port zero (WA0), and a PUSH signal is asserted at the write enable pin of port zero (WE0). The write data pin of port zero. (WD0) is hardwired to logic one ("1"). Thus when a tag is returned to the tag generator, that tag is marked "free."

Figure 18:
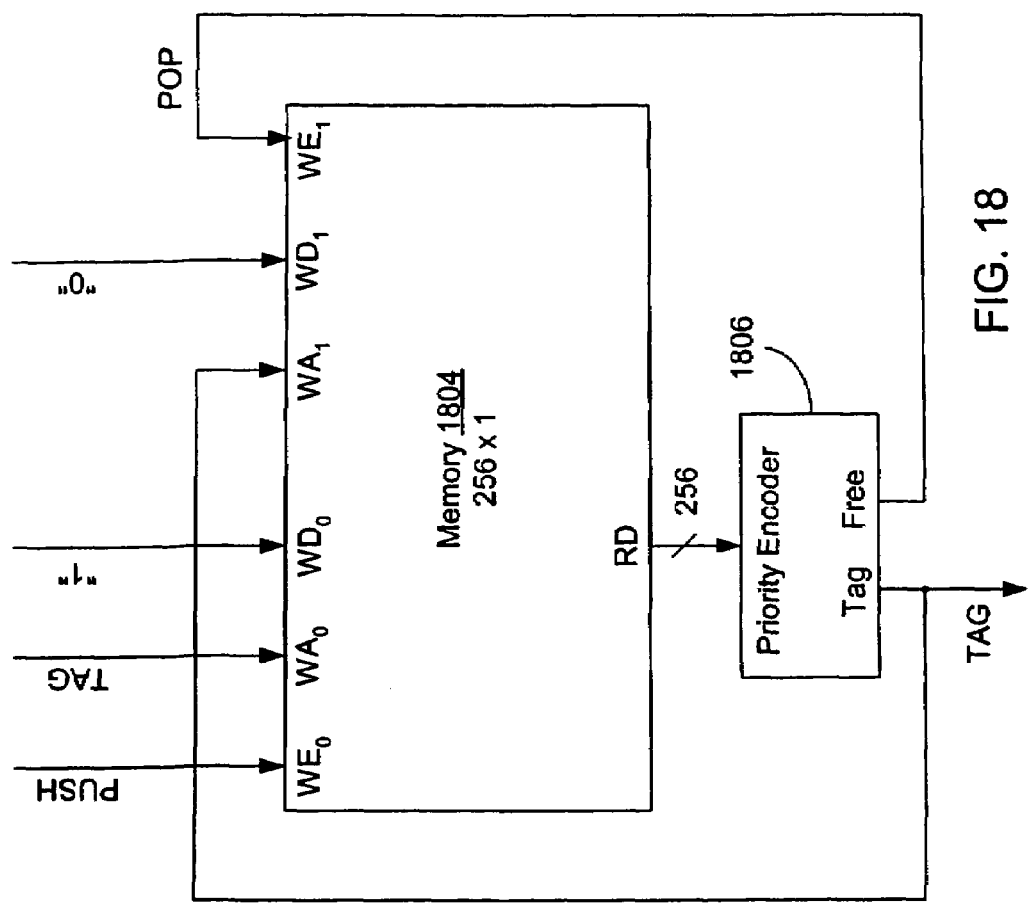
FIG. 18 depicts a tag generator according to another implementation.

In another implementation, shown in FIG. 18, comparator 1706 is replaced by a priority encoder 1806 that implements a binary truth table where each row represents the entire contents of a memory 1804. Memory 1804 writes single bits at two write ports $WD_0$ and $WD_1$, and reads 256 bits at a read port RD. Memory 1804 is initialized to all zeros. No counter is used.

One of the rows is all logic zeros, indicating that no tags are free. Each of the other rows contains a single logic one, each row having the logic one in a different bit position. Any bits more significant than the logic one are logic zeros, and any bits less significant than the logic one are "don't cares" ("X"). Such a truth table for a 1×4 memory is shown in Table 1.

TABLE 1

| RD | Free? | Tag |
|---|---|---|
| 0000 | No | none |
| 1XXX | Yes | 00 |
| 01XX | Yes | 01 |
| 001X | Yes | 10 |
| 0001 | Yes | 11 |

The read data from read port RD is applied to priority encoder 1806. If a tag is free, the output of priority encoder 1806 is used as the tag.

In the above-described implementations of the tag generator, a further initialization step is employed. A series of null operations (noops) is sent across each of busses 522 and 528. These noops do not cause the tag generators to generate tags. This ensures that when the first memory transaction is sent across a bus, the pair of tag generators associate with that bus generates the same tag for that memory transaction.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and. optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
a memory bus configured to transmit N memory transaction items at a time;
a queue configured to store more than N memory transaction items;
a memory circuit coupled to the memory bus, wherein the memory circuit comprises more than N memory banks, and wherein each memory transaction item is addressed to a memory bank;
a multiplexer comprising at least N multiplexer inputs and a multiplexer output, wherein each multiplexer input is coupled to one of the memory transaction items, and wherein the multiplexer output is coupled to the memory bus;
a state machine coupled to the multiplexer output, wherein the state machine is configured to generate a bank readiness signal that identifies the readiness of a memory bank to accept a memory transaction item that is addressed to the memory bank; and
an arbiter controller coupled to the state machine and a selection input of the multiplexer, wherein the arbiter controller is configured to activate the selection input of the multiplexer to select a memory transaction item to transmit from the queue to the addressed memory bank that is identified by the bank readiness signal.

2. The apparatus of claim 1 wherein the arbiter controller is further configured to select the memory transaction item to transmit from the queue to the memory bank based on a priority when more than one memory transaction items addressed to the same memory bank are identified by a bank readiness signal.

3. The apparatus of claim 2 wherein the arbiter controller is further configured to select the oldest memory transaction item to transmit from the queue to the memory.

4. The apparatus of claim 2 wherein each memory transaction item is stored in a request station in the queue, and further wherein the request station identifies the priority associated with the memory transaction item.

5. The apparatus of claim 1, wherein the state machine is further configured to reset the bank readiness signal for a memory bank when a memory transaction item is transmitted to the memory bank.

6. An apparatus comprising:
a queue circuit comprising a plurality of request stations arranged to store memory transactions, wherein each request station is coupled to a memory transaction request line;
a memory transaction multiplexer circuit comprising a plurality of multiplexer inputs, a multiplexer output, and a multiplexer selection input, wherein each multiplexer input is coupled to one of the memory transaction request lines; and
a memory circuit coupled to the multiplexer output, wherein the memory circuit comprises a plurality of memory banks, wherein each memory bank is configured to store a memory transaction transmitted from the queue circuit and addressed to the memory bank; and
a state machine circuit comprising a state machine input coupled to the multiplexer output and a state machine output coupled to the multiplexer selection input, wherein the state machine is configured to generate a bank readiness signal that identifies the readiness of a memory bank to accept a memory transaction that is addressed to the memory bank.

7. The apparatus of claim 6, wherein the state machine is further configured to reset the bank readiness signal for a memory bank when a memory transaction is transmitted to the memory bank.

8. An apparatus comprising:
a queue circuit comprising a plurality of request stations arranged to store memory transactions, wherein each request station is coupled to a memory transaction request line;
a memory transaction multiplexer circuit comprising a plurality of multiplexer inputs, a multiplexer output, and a multiplexer selection input, wherein each multiplexer input is coupled to one of the memory transaction request lines;
a memory circuit coupled to the multiplexer output, wherein the memory circuit comprises a plurality of memory banks, wherein each memory bank is configured to store a memory transaction transmitted from the queue circuit and addressed to the memory bank;

a state machine comprising a state machine input coupled to the multiplexer output and a plurality of state machine outputs, wherein the state machine is configured to generate a bank readiness signal that identifies the readiness of a memory bank to accept a memory transaction that is addressed to the memory bank; and an arbiter controller comprising a plurality of arbiter inputs coupled to the plurality of state machine outputs and an arbiter output coupled to the multiplexer selection input, wherein the arbiter controller is configured to activate the multiplexer selection input to select a memory transaction to transmit from the queue circuit to the addressed memory bank that is identified by the bank readiness signal.

9. The apparatus of claim 8, wherein the state machine is further configured to reset the bank readiness signal for a memory bank when a memory transaction is transmitted to the memory bank.

10. The apparatus of claim 8, wherein the arbiter controller is further configured to select a memory transaction to transmit from the queue circuit to the memory bank based on a priority when more than one memory transactions addressed to the same memory bank are identified by a bank readiness signal.

11. The apparatus of claim 10, wherein the arbiter controller is further configured to select the oldest memory transaction item to transmit from the queue to the memory.

12. The apparatus of claim 10, wherein the priority associated with the memory transaction is identified by the request station in which the memory transaction is stored.

13. The apparatus of claim 8, wherein the state machine is further configured to reset the bank readiness signal for a memory bank when a memory transaction is transmitted to the memory bank.

14. A method of using a multiplexer to manage the transmission of a plurality of memory transactions to a memory having a plurality of memory banks, the multiplexer comprising a plurality of multiplexer inputs for receiving the plurality of memory transactions and a multiplexer output for sending each of the plurality of memory transactions to the memory, the method comprising:

receiving a plurality of memory transactions at the multiplexer inputs, wherein each memory transaction is addressed to a corresponding memory bank;

associating a priority with each received memory transaction;

generating a plurality of bank readiness signals indicating the readiness of each memory bank available to accept a memory transaction, wherein the plurality of bank readiness signals are based on the plurality of memory transactions at the multiplexer inputs and the multiplexer output; and sending each of the plurality of memory transactions to its corresponding one of the plurality of memory banks via the multiplexer output based on the associated priorities and the bank readiness signals.

15. The method of claim 14, wherein the priority associated with each memory transaction is based on the order in which the memory transaction was received.

16. The method of claim 14, wherein the priority associated with each memory transaction is based on the memory transaction's position in a queue.

17. The method of claim 14, wherein generating a plurality of bank readiness signals indicating the readiness of each memory bank to accept a memory transaction comprises tracking the availability of memory banks and monitoring the memory addresses of the received memory transactions.

18. The method of claim 14, further comprising:

after sending one of the plurality of memory transactions to its corresponding one of the plurality of memory banks, clearing the bank readiness signal corresponding to the one memory bank to indicate that the memory bank is not available to accept a memory transaction.

19. The method of claim 18, further comprising:

after a predetermined period of time, generating a bank readiness signal corresponding to the one memory bank to indicate that the memory bank is available to accept a memory transaction.

20. A machine-readable storage device with instructions to cause a microprocessor to perform the steps of:

receiving a plurality of memory transactions at a multiplexer, wherein the multiplexer manages the transmission of the plurality of memory transactions to a memory having a plurality of memory banks, the multiplexer comprising a plurality of multiplexer inputs and a multiplexer output, wherein the plurality of memory transactions is received at the multiplexer inputs, and wherein each memory transaction is addressed to a corresponding memory bank;

associating a priority with each received memory transaction;

generating a plurality of bank readiness signals indicating the readiness of each memory bank available to accept a memory transaction, wherein the plurality of bank readiness signals are based on the plurality of memory transactions at the multiplexer inputs and the multiplexer output; and sending each of the plurality of memory transactions to its corresponding one of the plurality of memory banks via the multiplexer output based on the associated priorities and the bank readiness signals.

21. The machine-readable storage device of claim 20, wherein the priority associated with each memory transaction is based on the order in which the memory transaction was received.

22. The machine-readable storage device of claim 20, wherein the priority associated with each memory transaction is based on the memory transaction's position in a queue.

23. The machine-readable storage device of claim 20, wherein generating a plurality of bank readiness signals indicating the readiness of each memory bank to accept a memory transaction comprises tracking the availability of memory banks and monitoring the memory addresses of the received memory transactions.

24. The machine-readable storage device of claim 20, further comprising:

after sending one of the plurality of memory transactions to its corresponding one of the plurality of memory banks, clearing the bank readiness signal corresponding to the one memory bank to indicate that the memory bank is not available to accept a memory transaction.

25. The machine-readable storage device of claim 24, further comprising:

after a predetermined period of time, generating a bank readiness signal corresponding to the one memory bank to indicate that the memory bank is available to accept a memory transaction.

* * * * *